US011568146B2

(12) United States Patent
Stovezky et al.

(10) Patent No.: US 11,568,146 B2
(45) Date of Patent: Jan. 31, 2023

(54) LOCATION-BASED MODE(S) FOR BIASING PROVISIONING OF CONTENT WHEN AN AUTOMATED ASSISTANT IS RESPONDING TO CONDENSED NATURAL LANGUAGE INPUTS

(71) Applicant: Google LLC, Mountain View, CA (US)

(72) Inventors: Sharon Stovezky, San Francisco, CA (US); Yariv Adan, Cham (CH); Radu Voroneanu, Zurich (CH); Behshad Behzadi, Freienbach (CH); Ragnar Groot Koerkamp, Adliswil (CH); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 534 days.

(21) Appl. No.: 16/605,838

(22) PCT Filed: Sep. 10, 2019

(86) PCT No.: PCT/US2019/050335
§ 371 (c)(1),
(2) Date: Oct. 17, 2019

(87) PCT Pub. No.: WO2021/050047
PCT Pub. Date: Mar. 18, 2021

(65) Prior Publication Data
US 2021/0069986 A1    Mar. 11, 2021

(51) Int. Cl.
*G06F 40/295* (2020.01)
*G06F 16/9537* (2019.01)

(52) U.S. Cl.
CPC ........ *G06F 40/295* (2020.01); *G06F 16/9537* (2019.01)

(58) Field of Classification Search
None
See application file for complete search history.

(56) References Cited

U.S. PATENT DOCUMENTS 7,376,640 B1    5/2008  Anderson et al.
8,731,942 B2    5/2014  Cheyer et al.
(Continued)

FOREIGN PATENT DOCUMENTS

EP    2339576    6/2011
WO    2011088053    7/2011

OTHER PUBLICATIONS

Pankaj, M.; "Context-Aware Computing: Beyond Search and Location-Based Services;" IEEE Internet Computing, vol. 16, No. 2; pp. 12-16; Mar. 2012.
(Continued)

*Primary Examiner* — Robert W Beausoliel, Jr.
*Assistant Examiner* — Cheryl M Shechtman
(74) *Attorney, Agent, or Firm* — Gray Ice Higdon

(57) ABSTRACT

Implementations set forth herein relate to an automated assistant that operates according to a variety of different location-based biasing modes for rendering responsive content for a user and/or proactively suggesting content for the user. The user can provide condensed spoken utterances to the automated assistant, when the automated assistant is operating according to one or more location-based biasing modes, but nonetheless receive accurate responsive outputs from the automated assistant. A responsive output generated by biasing toward a subset of location characteristic data that has been prioritized over other subsets of location characteristic data. The biasing allows the automated assistant to compensate for any details that may be missing from a spoken utterance, but allows the user to provide shorter
(Continued)

spoken utterances, thereby reducing an amount of language processing when processing inputs from the user.

18 Claims, 10 Drawing Sheets

(56) References Cited

U.S. PATENT DOCUMENTS

| | | | |
|---|---|---|---|
| 8,954,860 B1* | 2/2015 | Hands | G06F 16/29 |
| | | | 715/738 |
| 9,501,743 B2 | 11/2016 | Tur et al. | |
| 9,798,799 B2 | 10/2017 | Wolverton et al. | |
| 9,940,362 B2 | 4/2018 | Lim et al. | |
| 10,438,587 B1* | 10/2019 | Lam | G06N 3/008 |
| 2009/0271371 A1* | 10/2009 | Levin | G06F 16/29 |
| 2009/0292684 A1* | 11/2009 | Aggarwal | G06F 16/951 |
| | | | 707/999.005 |
| 2010/0174703 A1* | 7/2010 | Dandekar | G06F 16/9537 |
| | | | 707/E17.014 |
| 2011/0137881 A1 | 6/2011 | Cheng et al. | |
| 2011/0184981 A1* | 7/2011 | Lu | G06F 16/9537 |
| | | | 707/774 |
| 2013/0268540 A1* | 10/2013 | van Dijk | G06F 16/29 |
| | | | 707/748 |
| 2014/0108453 A1 | 4/2014 | Venkataraman et al. | |
| 2015/0234889 A1* | 8/2015 | Duleba | G06F 16/9537 |
| | | | 707/769 |
| 2016/0055218 A1 | 2/2016 | Grimsmo et al. | |
| 2018/0341637 A1* | 11/2018 | Gaur | G06F 40/211 |

OTHER PUBLICATIONS

European Patent Office; International Search Report and Written Opinion of PCT Ser. No. PCT/US2019/050335; 15 pages; dated Jun. 9, 2020.

* cited by examiner

LOCATION-BASED MODE(S) FOR BIASING PROVISIONING OF CONTENT WHEN AN AUTOMATED ASSISTANT IS RESPONDING TO CONDENSED NATURAL LANGUAGE INPUTS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

When a user is visiting a point of interest, a user may provide a number inquiries to an automated assistant in order to retrieve information and/or perform particular actions associated with the point of interest to which they are visiting. However, given the limited battery charge of most portable electronic devices, frequent and/or prolonged inputs to an automated assistant can consume energy resources as well as computational resources at a corresponding portable electronic device. Such limitations can be especially problematic when a user is in an unfamiliar area, unable to access mains power for recharging their portable electronic device, and/or unable to speak a language that is native to the area, thereby limiting their access to information when their portable electronic device is without battery charge. Furthermore, when visiting an unfamiliar area, the user may not recognize the most useful accommodations for their visit until they have reached the end of their visit. As a result, the user may have expended certain resources unnecessarily because of their unfamiliarity with certain available accommodations such as train schedules, help desks, restroom locations, hospitals, charging stations, and/or any other accommodations that can be useful during a visit. Although a user can inquire about certain accommodations from their respective automated assistant, such frequent and/or prolonged inquiries can consume energy and other computational resources, thereby expediting battery drain of their respective portable electronic device.

SUMMARY

Implementations set forth herein relate to operating an automated assistant, for a client device, according to a variety of different location-based biasing modes for rendering content responsive to a user input (e.g., a spoken utterance) and/or proactively. In some implementations, the location-based biasing modes available for a client device of a user at a given location of the client device include at least a first location-based biasing mode and a second location-based biasing mode. The first location-based biasing mode biases responsive and/or proactive rendering of content toward the location to a first extent. The second location-based biasing mode biases responsive and/or proactive rendering of content toward the location to a second extent that is greater than the first extent. The biasing in the first and/or second location-based biasing modes can include, for example, speech-to-text biasing, content score biasing, source biasing, and/or query modification biasing. For example, in the first location-based biasing mode each of the preceding can be biased to a corresponding first extent, and in the second location-based biasing mode each of the preceding can be biased to a corresponding second greater extent. As another example, in the first location-based biasing mode speech-to-text biasing can occur without query modification biasing, while in the second location-based biasing mode query modification biasing can occur as well as speech-to-text biasing (with optionally a greater extent of speech-to-text biasing).

As a result of the greater extent of biasing in the second location-based biasing mode, the user can provide more concise (at least relative to the first location-based biasing mode) spoken utterances and/or other inputs via the client device to cause the automated assistant to provide responsive location-specific information and/or to perform location-specific actions. The more concise inputs conserve battery life and/or other resource(s) of the client device as client device resource(s), required to process the inputs, are active for less time in processing the more concise inputs. Further, the more concise inputs shorten the overall duration of user/automated assistant interactions that occur via the client device, further conserving battery life and/or other client device resource(s). Yet further, in various implementations the greater extent of biasing in the second location-based biasing mode provides more efficient client and/or server resolution of spoken utterances and/or other inputs. As one example, and as described in more detail herein, in the second location-based biasing mode, the corpus of content that is considered in responding to a user input can be biased heavily toward (or even restricted to) a certain subset of content, such as a subset of content that has a defined relationship to the location. As another example, and as described in more detail herein, in the second location-based biasing mode a query can be more aggressively rewritten in view of the location to result in a lesser quantity of content being considered to be responsive to the query.

While the second location-based biasing mode provides various technical benefits when location-specific content and/or actions are sought, implementations disclosed herein can enter the second location-based biasing mode in response to satisfaction of certain condition(s), so as to not inadvertently overly bias toward the location (and potentially counteract the technical benefits). For example, the first location-based biasing mode can be utilized when the certain condition(s) are not satisfied. As described herein, the first location-based biasing mode provides a degree of biasing toward the location, but the degree of biasing is lesser than that of the second-location based biasing mode. The condition(s) for entering the second location-based biasing mode can include, for example, affirmative user input (proactive or responsive to an automatically generated prompt) indicating a desire to enter the second location-based biasing mode. The condition(s) can additionally or alternatively include being in the location and determining presence of one or more contextual condition(s). The contextual condition(s) can include, for example, determining that the client device and/or the user has never been to the location (or has been in the location less than a threshold quantity of times); determining that email(s), search history, and/or calendar data of the user indicate a particular purpose for being in the location; and/or other contextual condition(s). In some implementations, determining the client device is in the location and the contextual condition(s) are present can cause the automated assistant to automatically transition to the second location-based biasing mode for the client device. In some other implementations, determining the client device is in the location and the contextual condition(s) are present can cause a prompt to be rendered via the client device and the automated assistant automatically transitions to the second location-based biasing mode for the client device if affirmative input is received responsive to the prompt. In various implementations, a provided prompt and/or other rendered output informs a user of the client device that the second-location based biasing mode has been entered, providing an implicit queue for the user to provide more concise inputs.

Some non-limiting examples are now provided of how biasing can differ between a first location-based biasing mode and a second location-based biasing mode. For instance, when operating according to a first location-based biasing mode, speech-to-text processing can be biased for a particular portion (e.g., a first and/or second term) of each spoken utterance and/or biased toward a first set of terms. However, when operating in a second location-based biasing mode, speech-to-text processing can be biased for a greater portion (e.g., all terms or less than all terms) of each spoken utterance relative to that of the first location-based biasing mode, and/or can be biased toward a second set of terms that are different and/or include more terms than the first set of terms. Additionally, or alternatively, when operating according to the first location-based biasing mode, document and/or data source scoring can be biased for a particular location to a particular degree, whereas when operating according to the second location-based biasing mode, document and/or data source scoring can be biased for the particular location to a greater degree. Additionally, or alternatively, when operating in the first location-based biasing mode, certain parts of speech (e.g., pronouns) of a query derived from a spoken utterance can be modified to be replaced by area-relevant aliases (e.g., a city name, region name, state name, village name, etc.). Furthermore, in the second location-based biasing mode other parts of speech of a query can additionally or alternatively be modified and/or the query can be supplemented with location-specific aliases (e.g., name of a location of interest such as a statue, artwork, historical landmark, etc.). These modes can be transitioned between when a user responds to a prompt, when a user enters a particular location, when a user is determined by the automated assistant to have followed a suggestion rendered via the automated assistant, and/or in response to any other indication that can be associated with a change in context of a user.

As an example, a user can be visiting Singapore as part of an international vacation, and may be interested in seeing certain landmarks and tasting certain foods in the area. Because Singapore may be an unfamiliar area to the user, the user may access their automated assistant for information more frequently than they would in their home country. For example, while the user is visiting Singapore, the user may come across a landmark that they would like to know more about but may not know the name of Therefore, in order to ask certain questions about the particular landmark, the user may first provide multiple queries in order to determine the name of the landmark that they would be referring to. For example, the user may invoke an automated assistant through their portable computing device by providing a spoken utterance such as, "Assistant, is it possible to book a room in the large building in Singapore that looks like it has a boat on top of it?" Depending on the bandwidth of a network that the portable computing device is connected to, as well as the versatility of the speech-to-text processing available via the portable computing device, the automated assistant may not provide an adequate response within a reasonable time. For instance, because the spoken utterance may be longer than the average spoken utterance from the user, the portable computing device may exhibit some amount of latency in order to both interpret the spoken utterance and provide a response to the spoken utterance.

In order to mitigate such latency, and preserve computational resources such as power and processing bandwidth, the automated assistant can operate according to one or more location-based biasing modes. The one or more location based biasing modes can cause the automated assistant to allow the user to provide inputs that consume substantially less computational resources when being processed by the portable computing device. Alternatively, or additionally, when the automated assistant is operating according to one or more location-based biasing modes, the automated assistant can proactively render content for the user in furtherance of eliminating the need for the user to participate in an extensive dialogue session in order to gather information that would otherwise be conveyed by the proactively-rendered content. Alternatively, or additionally, when the automated assistant is operating according to one or more location-based biasing modes, query modification can be performed according to the particular location-based biasing mode that the automated assistant is operating according to. For instance, certain location-based biasing modes can cause the automated assistant to operate according to a first location-based biasing mode (e.g., a location-specific biasing mode) or a second location-based biasing mode (e.g., a landmark-specific biasing mode), thereby allowing the automated assistant to modify input queries (e.g., "Assistant, how tall is that?") according to whether the user is within a general location (e.g., "Assistant, how tall is that [in Singapore]?") and/or near a more specific location (e.g., "Assistant, how tall is [The Sky Park]").

In furtherance of the aforementioned example, while the user is navigating within an area of their international visit, their portable computing device can provide a prompt for allowing the user to select whether to enter a location-based biasing mode. Should the user elect to enter the location-based biasing mode, the automated assistant can be put on notice of certain locations of interest that are within the area that the user is located within. When the automated assistant is put on notice that the user is located near a particular location of interest, such as a landmark, the automated assistant can operate to bias certain inputs and/or outputs according to data that is relevant to the landmark. As an example, instead of the user providing the previous query (i.e., "Assistant, is it possible to book a room in the large building in Singapore that looks like it has a boat on top of it?"), the automated assistant can proactively render content via one or more interfaces of the portable computing device in order to put the user on notice of the name of the particular landmark. For instance, the name of the particular landmark can be "The Sky Park," and the automated assistant can render the name "The Sky Park" at a display interface of the portable computing device prior to receiving in related input from the user. In this way, should the user have the same inquiry as before, the user can provide a shorter spoken utterance in order to convey the same query (e.g., "Assistant, is it possible to book a room in The Sky Park?"). In this way, computational resources can be preserved when they may be most critical, such as when the user is at a location they are unfamiliar with and therefore may need to preserve certain resources in case of an emergency, or in case they enter an area where there is limited network availability.

In some implementations, when identifying certain content to provide to a user that is located within a particular area and/or near a particular location of interest within the area, certain subsets of data can be scored higher than others for identifying such content. For instance, in order to bias towards certain content when an automated assistant is operating according to a particular location-based biasing mode, certain subsets of location characteristic data can be scored to promote certain content over others. As an example, when the automated assistant is not operating according to any particular location-based biasing mode and the user provides a spoken utterance, the automated assistant can render a responsive output based on a variety of different data. This variety of different data can be associated with the user (e.g., calendar data, application data, message data, etc.), the spoken utterance, a given context, and/or any other related information. However, when the user has visited a particular area and/or a particular location of interest, such as a landmark, data that is used to render a responsive output can be processed according to a particular location-based biasing mode.

As an example, location characteristic data can be available for providing content that details certain features of an area in which the user is visiting, as well as one or more locations of interest within the area. When the user arrives to the area with their respective portable computing device, the automated assistant can transition to operating according to a first location-based biasing mode. As a result, the location characteristic data can be processed to identify a subset of location characteristic data for biasing to a greater extent than other data of location characteristic data that is not part of the subset of location characteristic data, at least for purposes of using the subset for rendering responsive content for the user. For instance, in accordance with the previous example, when the user is located in Singapore and provides an inquiry regarding a certain area in Singapore, a subset of location characteristic data corresponding to that certain area can be assigned a score. This score can prioritize the subset of location characteristic data over other location characteristic data, at least for purposes of generating responsive output for the user.

Furthermore, when the user is located within a portion of the area that includes the location of interest (e.g., "The Sky Park"), and the user provides an inquiry regarding the location of interest, a separate subset of the location characteristic data can be assigned a particular score. The particular score can prioritize this separate subset of the location characteristic data over the other location characteristic data and the subset of location characteristic data corresponding to the certain area that was previously assigned a score. In this way, should the particular score for the separate subset of location characteristic data be prioritized over any other assigned score, the separate subset of location characteristic data can be used as a basis for suggesting content and/or rendering responsive content for the user. As an example, a subset of location characteristic data that is prioritized over all other location characteristic data can be used as a basis for modifying a query from a user, providing automatic suggestions for a user when they are moving towards the location of interest, and/or otherwise biasing toward providing content that is prioritized over other content for rendering to the user when they are near a location of interest within an area.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
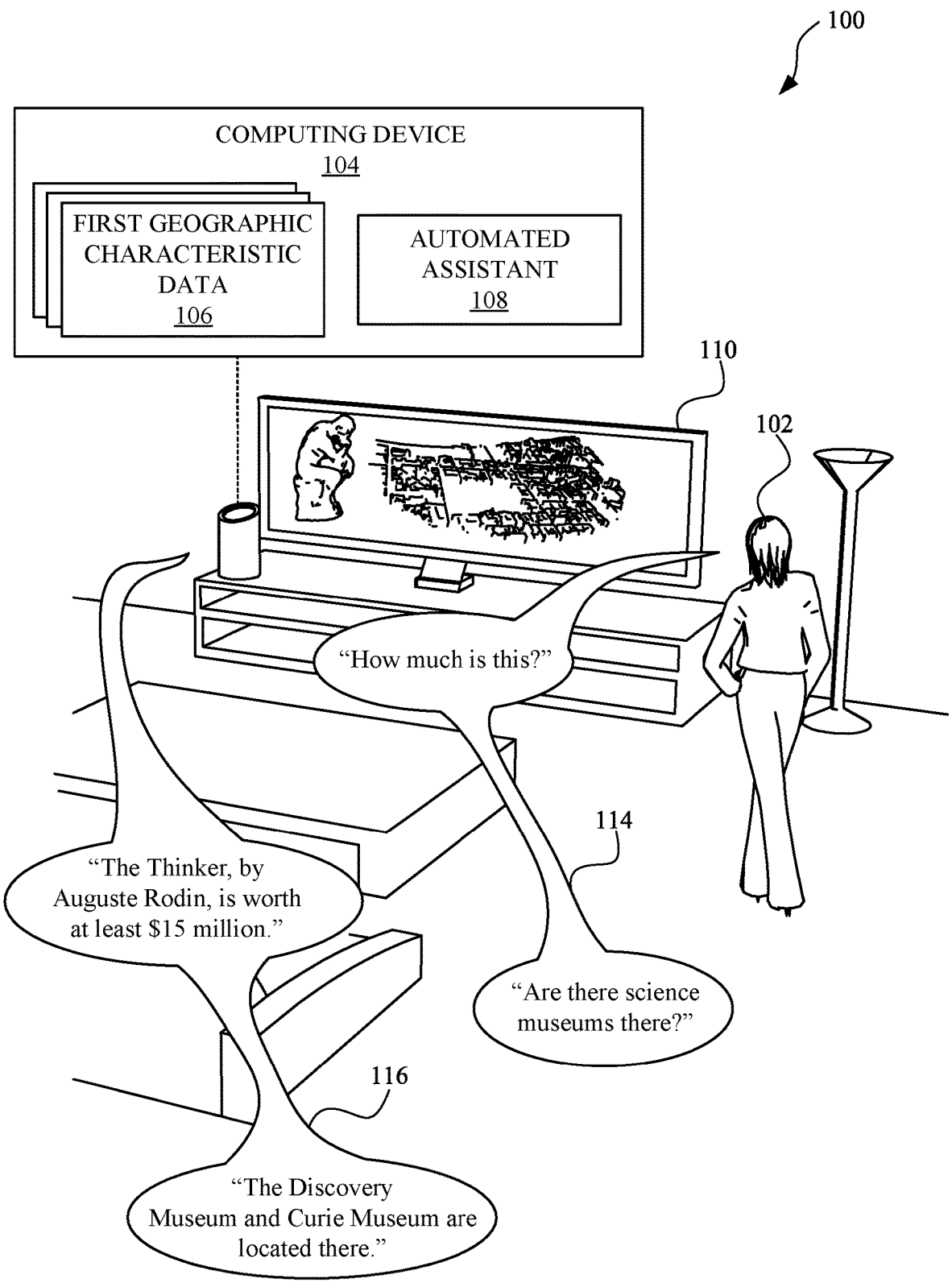
FIG. 1A, FIG. 1B, and FIG. 1C illustrate views of a user interacting with an automated assistant that operates according to one or more location-based biasing modes.
Figure 1B:
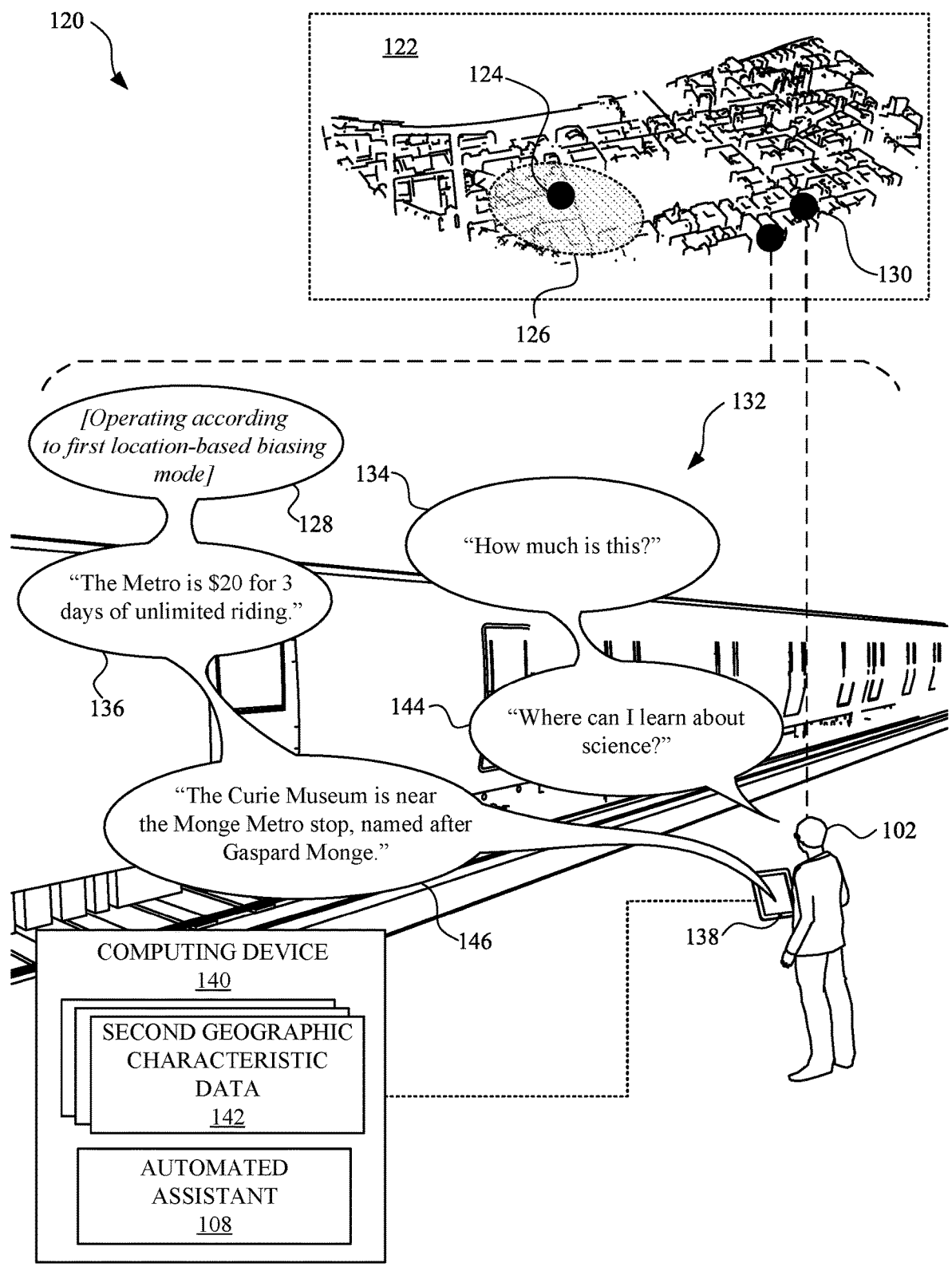
Figure 1C:
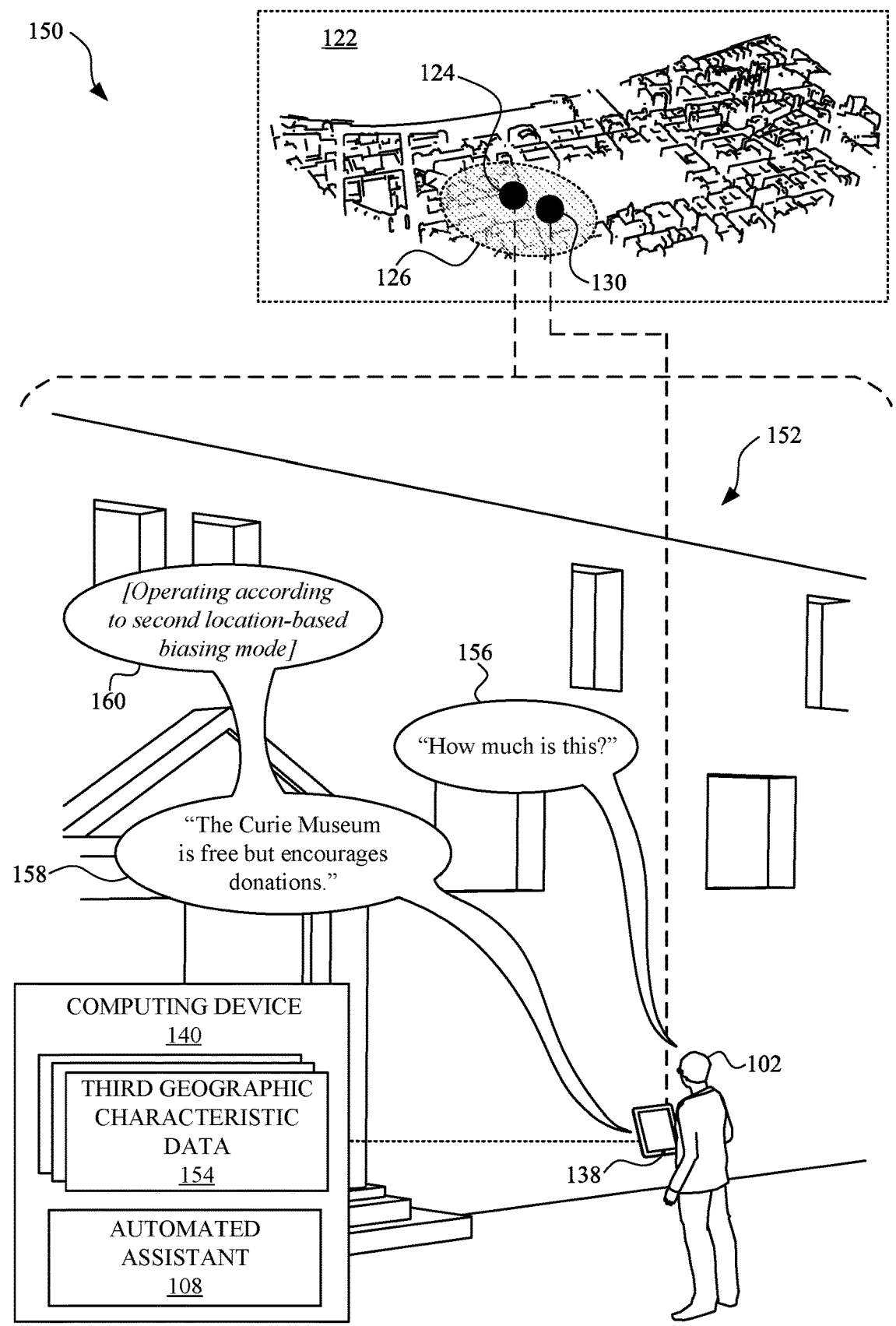

FIG. 1A, FIG. 1B, and FIG. 1C illustrate a view 100, a view 120, and a view 150, respectively, of a user 102 interacting with an automated assistant that operates according to one or more location-based biasing modes. Specifically, FIG. 1A illustrates a view 100 of the user 102 interacting with an automated assistant 108 that is accessible via a computing device 104 that is located within a home of the user 102. The automated assistant 108 can receive requests from the user 102 in order to control one or more applications of the computing device 104, and/or one or more other devices that are in communication with the computing device 104. For example, the user 102 can control a television 110 to provide graphical content in response to a request to the automated assistant 108. The automated assistant 108, with prior permission from the user 102, can identify content that is being rendered at the television 110 in order to generate contextual data that can be used to bias processing of inputs and/or outputs.

In some implementations of the automated assistant 108, first geographic characteristic data 106 can be generated for detailing features of a location of the user 102. The first geographic characteristic data 106 can also be used to determine whether to operate the automated assistant 108 according to one or more location-based biasing modes. The location-based biasing modes can be activated according to geographic criteria that is established by an entity that provides the automated assistant 108 and/or a third-party entity that is different from the entity that provided the automated assistant 108. For example, a third party entity can establish geographic criteria for operating the automated assistant 108 in a first location-based biasing mode when the user 102 is located in a particular area that is outside of their home. Furthermore, another third-party entity can establish geographic criteria for operating the automated assistant 108 in a second location-based biasing mode when the user 102 is located near a particular location of interest that is outside of their home and within the particular area. However, when the first geographic characteristic data 106 does not satisfy any geographic criteria corresponding to an area or location of interest, the automated assistant 108 can operate according to an operating mode in which the spoken utterance and/or other contextual data is processed in order to provide a responsive output to the user 102.

For example, when the user 102 is in their home watching the television 110, content related to a museum in another country can be rendered at the television 110. In order to obtain more information about the content, the user 102 can provide a spoken utterance 114 to the automated assistant 108. The spoken utterance can be, for example, "How much is that?" In some implementations, the automated assistant 108 can use voice identification, with prior permission from the user 102, in order to determine that the user 102 is the one who is interacting with the automated assistant 108. Additionally, the computing device 104 can generate first geographic characteristic data 106 indicating that the user 102 is interacting with the automated assistant 108 within their home. Furthermore, the automated assistant 108 can access contextual data characterizing content being rendered at the television 110. Based on the user 102 being in their home, the automated assistant 108 can bypass operating according to a location-based biasing mode, and provide a responsive output to the user 102 based on the contextual data and the spoken utterance. For instance, in response to the spoken utterance 114, the automated assistant 108 can provide a responsive output 116 such as, "The Thinker, by Auguste Rodin, is worth at least $15 million."

In some implementations, the responsive output 116 can be stored as contextual data, and therefore can be used in order to generate subsequent responsive data in response to inputs from the user 102. For example, the user 102 can provide a subsequent spoken utterance 114 such as, "Are there science museums there?" In response, the automated assistant 108 can access contextual data that identifies content that has been and/or is being rendered at the television 110, as well as content embodied by any responsive output provided by the automated assistant 108. Based on this contextual data, the automated assistant 108 can provide another responsive output 116 such as, "The Discovery Museum and Curie Museum are located there." This responsive output can be based on data that is associated with the content of the previous responsive output provided by the automated assistant 108 (e.g., "The Thinker"), and/or search results generated by executing a search command that identifies content of the subsequent spoken utterance and content of the previous responsive output.

In some implementations, when the user 102 acknowledges certain responsive outputs over time, the automated assistant 108 can establish a unique biasing operating mode. This operating mode can be activated when certain contextual data satisfy contextual criteria corresponding to the context detailed in FIG. 1A. When the automated assistant 108 is operating according to the unique biasing operating mode, inputs to, and/or outputs from, the automated assistant 108 can be processed with a bias toward sources of data and/or subsets of data previously used to provide the responsive output that was previously the basis for generating the unique biasing operating mode (e.g., website(s) that were the source of the content for the search results). In this way, various unique biasing operating modes can be uniquely generated for different users that interact with the automated assistant 108. This allows the automated assistant 108 to be more readily responsive to condensed inputs, such as when the user 102 replaces specific details and/or proper names with pronouns and/or other language In order to provide a condensed input.

FIG. 1B illustrates a view 120 of the user 102 when they have left their respective home to visit an area 122 that is outside of their home residence. When the user 102 is visiting an area outside of their home, such as a location that has been suggested by the automated assistant 108 or identified by content that is accessible to the automated assistant 108, the user 102 can be solicited, via a prompt at a portable computing device 138, regarding whether they want the automated assistant 108 to transition into a first location-based biasing mode. The prompt can be provided based on second geographic characteristic data 142 that is generated by, or otherwise accessible to, computing device 140 (i.e., the portable computing device 138). The second geographic characteristic data 142 can optionally indicate, with prior permission from the user 102, that the user 102 is at a particular location 130 that is adjacent to a public transit station 132 within the area 122.

When the user 102 selects to have the automated assistant 108 operate according to the first location-based biasing mode, inputs to, and/or outputs from, the automated assistant 108 can be biased with respect to data that is used to process the inputs and/or outputs. Specifically, when operating in the first location-based biasing mode, the processing can be biased to be based on location characteristic data characterizing the area 122, over other data that does not characterize the area 122. In some implementations, the automated assistant 108 can automatically transition into the first location-based biasing mode in response to the user 102 relocating to the area 122 that was previously identified by the automated assistant 108 and/or identified by content (e.g., content of video playback requested by the user 102 when the user 102 was interacting with the automated assistant 108) that is accessible to the automated assistant 108. For example, because the user 102 provided a query that resulted in rendering of an output that identified a particular landmark (e.g., "The Thinker") located in an area 122, the automated assistant 108 can automatically transition into the first location-based biasing mode in response to the user 102 arriving in the area 122. In this way, the automated assistant 108 can operate to guide the user 102 through the area 122 under assumption that the user 102 is interested in learning more about the area 122. In some implementations, biasing of processing of inputs and/or outputs can be based on whether data being processed is associated with, or otherwise identifies, content previously rendered during an interaction between the user 102 and the automated assistant 108. For instance, when operating in the first location-based biasing mode while the user 102 is in the area 122, the computing device 140 can rank certain documents and/or data sources that identify "The Thinker" to a particular degree higher than documents and/or data sources that do not identify "The Thinker." Furthermore, when operating in a second location-based biasing mode while the user 102 is in the area 122, the computing device 140 can rank certain documents and/or data sources that identify "The Thinker" to a greater degree relative to the particular degree they were ranked in the first location-based biasing mode.

As an example, when the user 102 is at the location 130 near the public transit station 132, the user 102 can provide a spoken utterance 134 such as, "How much is this?" In response, the automated assistant 108 can access content with which to generate a responsive output from. However, when processing the content, the automated assistant 108 can bias toward location characteristic data that characterizes the area 122 and the location 130. Specifically, the computing device 140 can score one or more subsets of data provided by one or more sources according to their relevance to the spoken utterance 134, and then modify one or more assigned scores in order to prioritize certain subsets of data over others. The subsets of data that are prioritized over others can correspond to sources of location characteristic data that characterize the public transit station 132. Therefore, when responding to the inquiry "How much is this?", the automated assistant 108 can generate a responsive output that is based on a most prioritized subset of data (e.g., a fee schedule provided by a public metro station website). For instance, the automated assistant 108 can cause the computing device 140 to render a responsive output 136 such as "The Metro is $20 for 3 days of unlimited riding."

In some implementations, in order to bias an input to, and/or output from, the automated assistant 108 when operating in the first location-based biasing mode, the computing device 140 can perform query re-writing. Specifically, the computing device 140 can receive the spoken utterance 134 from the user 102, convert audio data generated from the spoken utterance 134 into natural language content, and then modify the natural language content according to the first location-based biasing mode before executing a query that is based on the natural language content. For example, the automated assistant 108 can bias the query re-writing according to a highest prioritized subset of location characteristic data, thereby causing the word "this" from the natural language content, with the word "The Metro." Therefore, the natural language content that is incorporated into a query for generating a suitable responsive output can be: "How much is [The Metro]." As a result of executing this query, the automated assistant 108 can identify information about the public transit station 132 and incorporate this data into the responsive output 136.

In some implementations, when the automated assistant 108 is operating according to the first location-based biasing mode 128, the user 102 can provide a spoken utterance 134 that relates to the area 122 rather than a particular location 130 (e.g., the public transit station 132) that the user 102 is currently located. For example, when the user 102 provides another spoken utterance 144 such as "Where can I learn about science?", the computing device 140 can generate and/or access second geographic characteristic data 142 and generate a characteristic embedding from the second geographic characteristic data. Additionally, the computing device 140 can generate and/or access results data corresponding to results from an execution of a query that is based on the natural language content of the other spoken utterance 144. When the computing device 140 identifies certain results that satisfy the query to a particular degree, the computing device 140 can generate embeddings from the results in order to determine a distance of each embedding from the characteristic embedding that is based on the second geographic characteristic data 142. Each embedding can then be scored according to a distance of each embedding from the characteristic embedding, and one or more embeddings that correspond to a shortest distance can be used as a basis for providing another responsive output 146. For instance, a first closest embedding can correspond to a science museum that is in the area 122, at a particular location of interest 124. Additionally, a second closest embedding can correspond to a metro stop that is near one or more science museums, and within a threshold distance 126 from the location of interest 124. The first closest embedding and the second closest embedding can be used as a basis for providing another responsive output 146 such as, "The Curie Museum is near the Monge Metro stop, named after Gaspard Monge."

Should the user 102 elect to visit a destination that was suggested by the automated assistant 108 while the automated assistant 108 is operating in the first location-based biasing mode, the automated assistant 108 can determine when the user 102 has arrived at the suggested destination and, in response, prompt the user 102 regarding operating in a second location-based biasing mode. In other words, because the automated assistant 108 suggested a particular destination while operating in the first location-based biasing mode, and the user 102 elected to go to the destination, the automated assistant 108 can prompt the user regarding whether the user 102 would like the automated assistant 108 to operate according to a second location-based biasing mode.

FIG. 1C illustrates a view 150 of the user 102 interacting with the automated assistant 108 when the automated assistant 108 is operating according to a second location-based biasing mode 160. The user 102 can select to operate the automated assistant 108 according to the second location-based biasing mode by providing an input to the computing device 140 in response to the automated assistant 108 providing a prompt regarding the second location-based biasing mode 160. When operating in the second location-based biasing mode, the automated assistant 108 can bias processing of inputs to, and/or outputs from, the automated assistant 108 according to a location of interest 124 that a user 102 is located at. For instance, the user 102 can relocate to at a particular location 130 that is within a threshold distance 126 from a location of interest 124, and within a particular area 122. When the user 102 provides an inquiry to the automated assistant 108, processing of the input can be biased according to a second location-based biasing mode, in which data corresponding to the location of interest 124 is prioritized over other data. Optionally, the data corresponding to the location of interest 124 can be prioritized over other data corresponding to the area 122.

For example, the user 102 can provide a spoken utterance 156 such as "How much is this?" In response, the computing device 140 can generate and/or access third geographic characteristic data 154 that is based on one or more sources of data characterizing the location of interest 124 and/or the area 122. The computing device 140 and/or a separate computing device (e.g., a server device) can process the third geographic characteristic data 154 in order to generate characteristic embeddings from the third geographic characteristic data 154. Furthermore, the computing device 140 and/or a separate computing device (e.g., a server device) can process audio data from the spoken utterance 156 and execute a query in order to identify data suitable for use when responding to the spoken utterance 156. One or more embeddings can then be generated from the resulting data identified by executing the query.

In order to bias a responsive output to the generated characteristic embeddings, the computing device 140 can identify a subset of embeddings that have a least amount of distance from an embedding corresponding to the content of the spoken utterance 156. Each subset of embeddings can then be assigned a score that is based on this distance. Furthermore, the computing device 140 can then identify a particular subset of the subsets of embeddings that have the least amount of distance from the characteristic embeddings. Each score assigned to those particular subsets can be modified in order to prioritize certain subsets that have a least amount of distance from the characteristic embeddings in an embedding space over other subsets of embeddings. An embedding with the highest or most prioritized score can then be identified, and a subset of data that is based on the embedding can be used as a basis for generating a responsive output 158 in response to the spoken utterance 156. For example, a highest prioritized subset of data can correspond to museum websites that provides a daily visiting schedule for the location of interest (e.g., The Curie Museum). The subset of data can be used to generate a responsive output 158 such as, "The Curie Museum is free but encourages donations."

In some implementations, as the user 102 continues to operate the automated assistant 108 while the automated assistant 108 is in the second location-based biasing mode, the automated assistant 108 can continue to bias processing of inputs to, and/or outputs from, to be based on the most prioritized subset of data (e.g., data from the museum websites). In this way, as the user 102 remains within the threshold distance 126 of the location of interest 124, they will receive responsive outputs from the automated assistant 108 that are based on the most prioritized subset of data. For example, should the user 102 decide to enter a museum 152 at the location of interest 124, and provide subsequent queries to the automated assistant 108 about exhibits within the museum (e.g., "How old is this laboratory?"), the automated assistant 108 can bias responses according to the highest prioritized subset of data corresponding to the location of interest. This can preserve computational resources that might otherwise be consumed processing longer queries from the user 102 (e.g., a longer version of the previous query could be: "How old is the laboratory exhibit in the Curie Museum in France?").

In some implementations, biasing of processing of inputs to the automated assistant 108 while operating in the second location-based biasing mode can include editing terms in a query that is generated based on a spoken utterance 156 from the user 102. For instance, when the automated assistant 108 is operating according to the second location-based biasing mode, the automated assistant 108 can replace ambiguous terms and/or pronouns with more specific terms identified in a highest prioritized subset of data. As an example, when the user provides the spoken utterance 156 of "How much is this?", the computing device 140 can replace the term "this" with another term or phrase from the most prioritized subset of data. The other term or phrase can be, for example, "a ticket to the Curie Museum." Therefore, the query that can be executed while operating in the second location-based biasing mode can be "How much is [a ticket to the Curie Museum]."

In this way, because the user 102 has accepted certain tour suggestions from the automated assistant 108, the automated assistant 108 can operate to provide a tour of certain areas that include one or more locations of interest. Therefore, so long as the user 102 is accepting certain suggestions, the automated assistant 108 can continually transition between the first location-based biasing mode and the second location-based biasing mode. This can therefore cause the automated assistant 108 to operate between different sizes of subsets of data, at least with respect to responding to inquiries about an area (e.g., area 122) versus inquiries about a particular location of interest (e.g., location of interest 124). This adaptability of the automated assistant 108 can allow the automated assistant 108 to be provide more accurate responses to more condensed inputs, such as spoken utterances. As result, computational resources of various computing devices can be preserved while a user is visiting, and therefore may not be familiar with locations to charge their device and/or otherwise glean more specific details to submit with their queries.

Figure 1D:
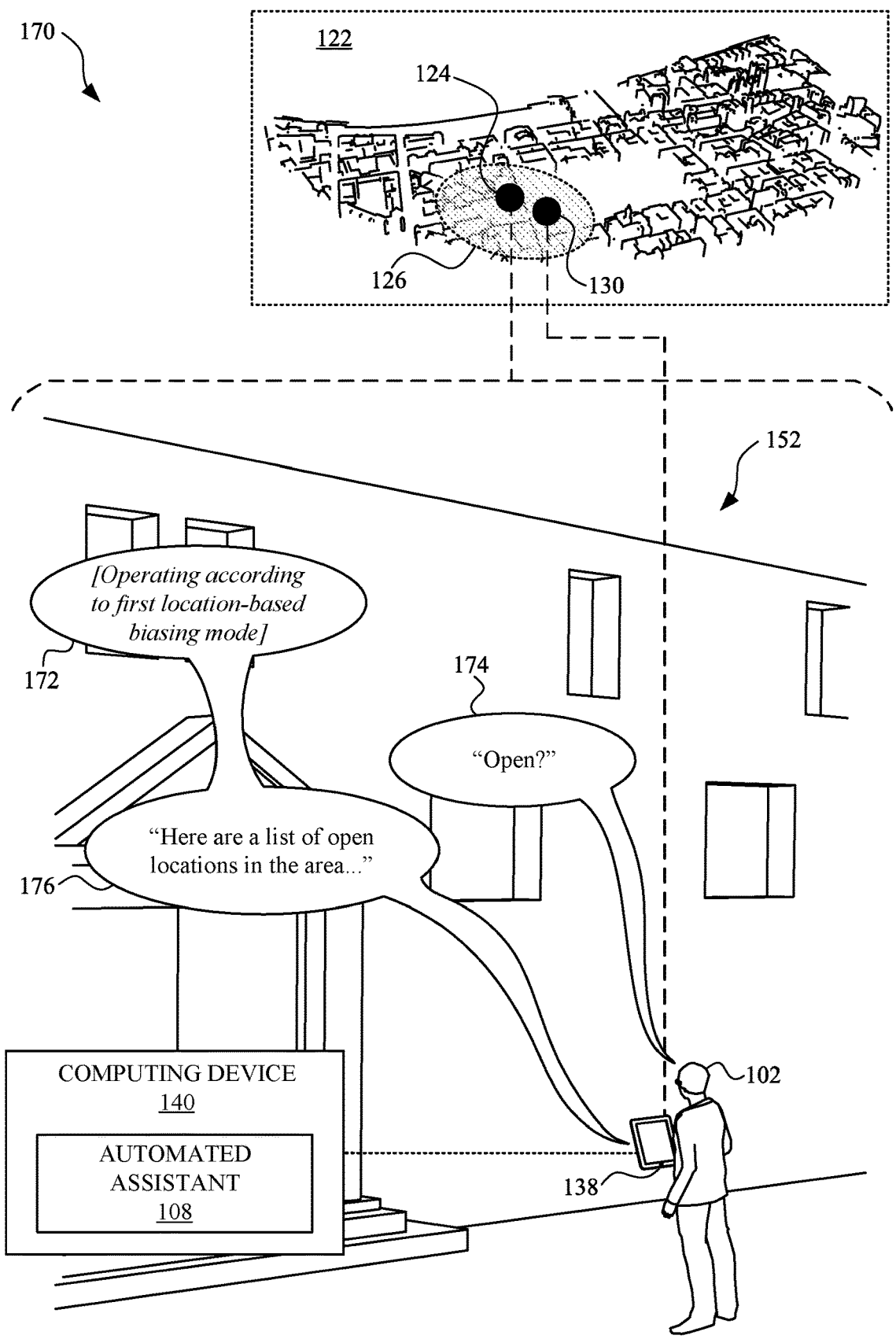
FIG. 1D and FIG. 1E illustrate views the automated assistant processing inputs and/or outputs according to one or more location-based biasing modes when the user is in the same location.
Figure 1E:
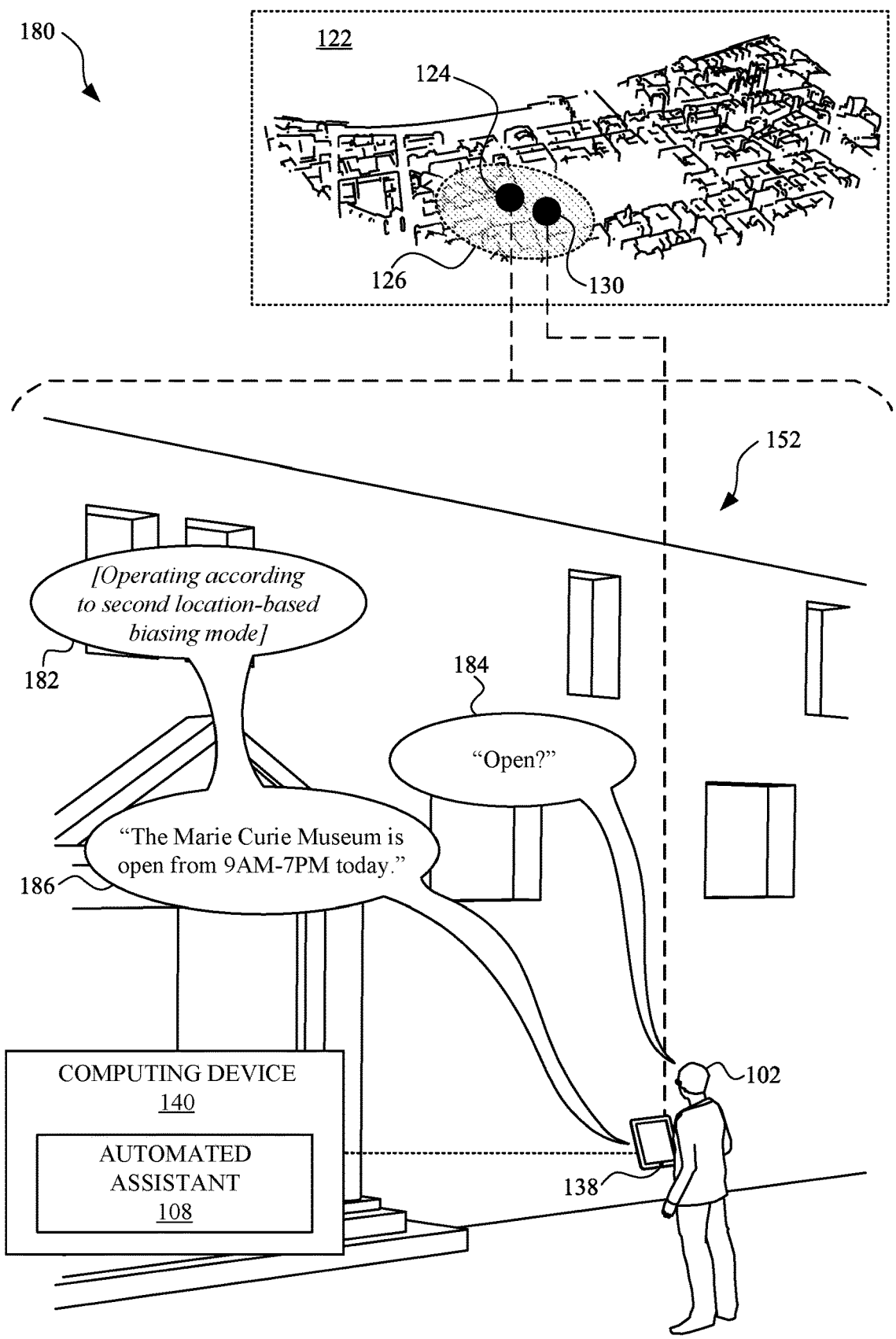

FIG. 1D and FIG. 1E illustrate a view 170 and a view 180, respectively, of the automated assistant 108 processing inputs and/or outputs according to one or more location-based biasing modes when the user 102 is in a same location, despite transitioning between modes. For instance, when operating their portable computing device 138, the user 102 can provide an indication that they desire the portable computing device 138 and/or the automated assistant 108 to operate according to a location-based biasing mode. The user 102 can provide this indication by an explicit input to the automated assistant 108, responding to a prompt provided by the automated assistant 108, and/or otherwise operating the computing device 140 to indicate a desire for the computing device 140 to operate according to a location-based biasing mode.

When the automated assistant 108 is operating according to status 172 in which a first location-based biasing mode is active, the user 102 can be located at the particular location of interest 124 such as the museum 152. When the user 102 is located at the location of interest 124, the automated assistant 108 can bias the processing of inputs and/or outputs according to the location of the user 102 and the first location-based biasing mode. For example, the user 102 can provide a spoken utterance 174 such as "Open?" in order to retrieve information about nearby businesses that are open. In response, the automated assistant 108 can bypass biasing processing of the spoken utterance 174 for certain data exclusively associated with the museum 152. Rather, the automated assistant 108 can bias the processing according to a greater corpus of documents and/or data, such as application data accessible via the computing device 140 (e.g., calendar data, messaging data, area-related location data, etc.). As a result, the automated assistant 108 can provide a responsive output 176 that may be relevant to the area 122 rather than being exclusively relevant to the location of interest 124 (e.g., the museum 152). The responsive output 176 can be, for example, "Here are a list of open location in the area . . . [Names of Open Businesses]."

In some implementations, the user 102 can elect to transition the automated assistant 108 into a second location-based biasing mode, as provided in view 180 of FIG. 1E, thereby causing a status 182 of the automated assistant 108 to be changed accordingly. Furthermore, when the user 102 remains at the same particular location 130 when transitioning between modes, processing of inputs to and/or outputs from the automated assistant 108 can be modified accordingly. For instance, should the user 102 indicate a desire for the computing device 140 to operate according to the second location-based biasing mode, processing of certain data can be biased based on the location of interest 124. As a result, should the user 102 provide a spoken utterance 184 such as, "Open?" in order to determine whether the particular location of interest 124 is open, one or more documents and/or sources of data relevant to the particular location of interest 124 can be biased to a greater degree than other documents and/or sources of data.

Additionally, or alternatively, natural language content of a query that is based on the spoken utterance 184 can be edited in order to bias the query toward the particular location of interest 124. For instance, the query can be modified to state, "[Curie Museum] open?" Additionally, or alternatively, results from executing the query can be re-ranked according to a degree with which each result is associated with the particular location of interest 124 (e.g., the museum 152). As a result, the computing device 140 can render content that is biased toward the particular location of interest 124 when the user 102 elects to enter the second location-based biasing mode. This can allow the user 102 to provide more concise spoken inputs without diminishing quality and/or accuracy of any responsive outputs, while also preserving computational resources.

In some implementations, the automated assistant 108 can transition into the second location-based biasing mode in response to the user 102 being located at the location of interest 124, and the automated assistant 108. Furthermore, the user 102 can bypass providing a spoken utterance to the automated assistant 108, but nonetheless receive content that is in accordance with the second location-based biasing mode. For example, in response to the automated assistant 108 determining that the user 102 is located at the location of interest 124, the automated assistant 108 can proactively render web pages, images, documents, sounds, videos, and/or any other content that can be relevant to a person that is located in the location of interest 124. In some implementations, when the automated assistant 108 operates to provide content proactively and without an initial input from the user 102, those suggestions can be ranked and/or prioritized according to one or more terms corresponding to the location of interest.

As an example, when the automated assistant 108 determines that the user 102 is located at the location of interest, the automated assistant can proactively render a schedule of times in which the user can access features of the location of interest 124. The schedule times can be rendered without the user 102 having previously requested the rendering of the schedule of times. Alternatively, or additionally, content can be rendered in response to the user 102 accessing their device and/or otherwise providing some indication that they intend to interact with their computing device. For example, the user 102 can access a browser from their computing device in order to look up news about an area they are visiting, and in response to opening the browser, the automated assistant 108 can proactively provide information about the location of interest 124, in accordance with the second location-based biasing mode.

Figure 2:
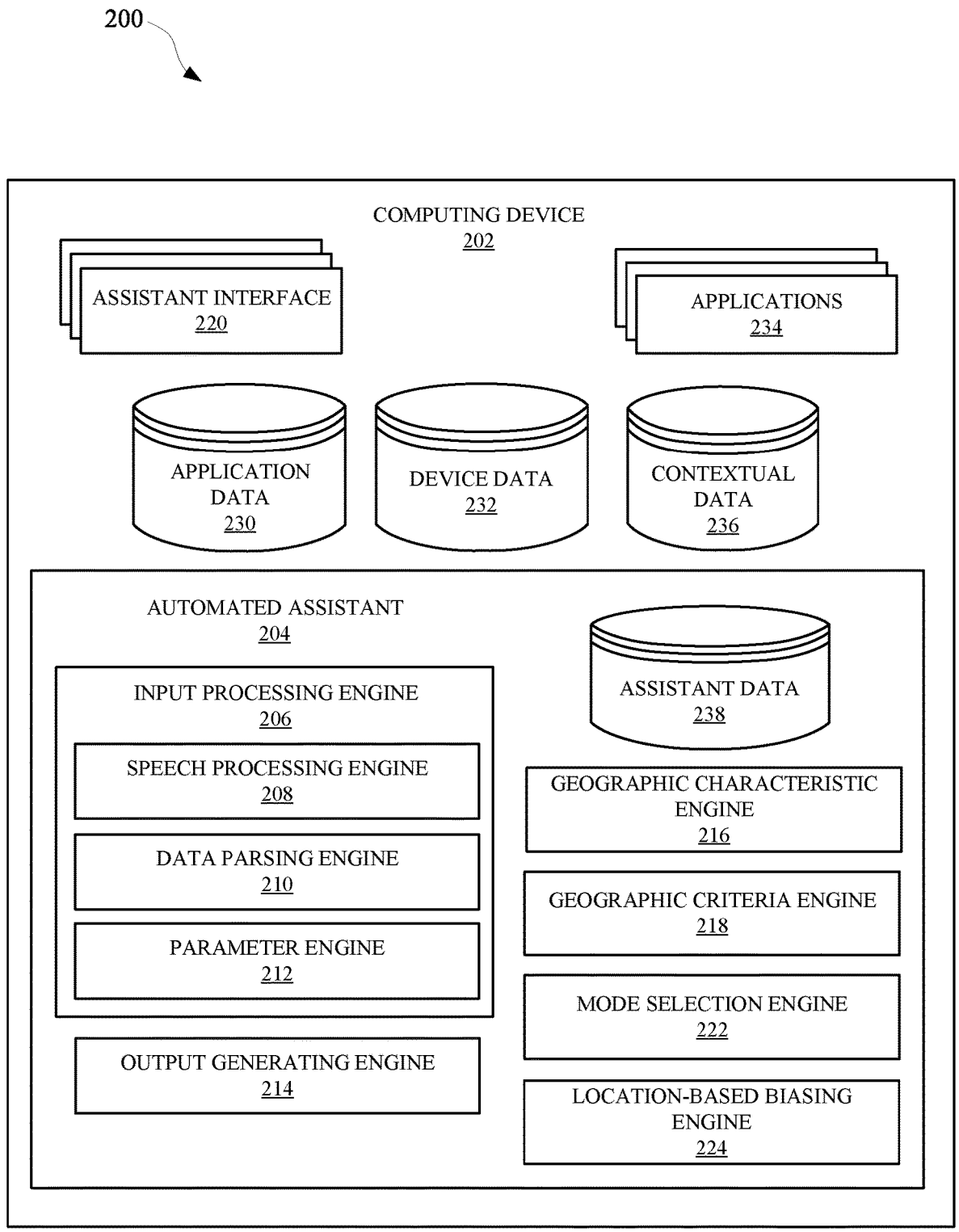
FIG. 2 illustrates a system for providing an automated assistant that can bias processing of inputs and/or outputs according to one or more location-based biasing modes in order to preserve computational resources when the user is visiting.

FIG. 2 illustrates a system 200 for providing an automated assistant 204 that can bias processing of inputs and/or outputs according to one or more location-based biasing modes in order to preserve computational resources when the user is visiting. The automated assistant 204 can operate as part of an assistant application that is provided at one or more computing devices, such as a computing device 202 and/or a server device. A user can interact with the automated assistant 204 via assistant interface(s) 220, which can be a microphone, sensor(s) (e.g., a GPS device), a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to perform a function (e.g., provide data, control a peripheral device, control a separate application, access an agent, generate an input and/or an output, etc.). The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition model can be used to generate recognized text for a spoken utterance (if any) present audio data. Also, for example, on-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s).

On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction (s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234. Furthermore, the application data 230 and/or any other data (e.g., device data 232) can be accessed by the automated assistant 204 to generate contextual data 236, which can characterize a context in which a particular application 234 is executing at the computing device 202 and/or a context in which a particular user is accessing the computing device 202.

While one or more applications 234 are executing at the computing device 202, the device data 232 can characterize a current operating status of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include a geographic characteristic engine 216, which can generate data that characterizes one or more geographic features of a context and/or circumstance. For example, as a user is operating their respective computing device 202, the geographic characteristic engine 216 can generate geographic characteristic data that is based on signals from one or more sensors that are in communication with the computing device 202. The geographic characteristic engine 216 can generate data characterizing a location of the user relative to a particular area, such as a city, town, and/or any other geographic area. Furthermore, the geographic characteristic engine 216 can generate data related to a location of interest that is within, or that corresponds to, the area in which the user is location. Moreover, the geographic characteristic engine 216 can generate that data indicates, with prior permission from the user, whether the user is navigating toward or away from an area in which they reside, such as their home city, town, and/or country.

In some implementations, the computing device 202 can include a geographic criteria engine 218 for determining whether data generated by the geographic characteristic engine 216 satisfies one or more geographic criteria. Geographic criteria can correspond to one or more location-based biasing modes that are defined by device data 232 and/or assistant data 238. For example, a location-based biasing mode can be a mode in which inputs to, and/or outputs from, the automated assistant 204 are processed such that certain area-related data is prioritized over other data. Additionally, or alternatively, another location-based biasing mode can be a mode in which inputs to, and/or outputs from, the automated assistant 204 are processed such that certain data characterizing a location of interest is prioritized over other data.

When the geographic criteria engine 218 determines that a geographic characteristic of a user satisfies a particular geographic criteria corresponding to a particular location-based biasing mode, the geographic criteria engine 218 can identify the geographic criteria that was satisfied to a mode selection engine 222. In other words, when a first geographic criteria corresponding to a first location-based biasing mode has been satisfied, the geographic criteria engine 218 can indicate this to the mode selection engine 222. Furthermore, when a second geographic criteria corresponding to a second location-based biasing mode has been satisfied, the geographic criteria engine 218 can indicate this to the mode selection engine 222. Moreover, when no geographic criteria corresponding any location-based biasing mode has been satisfied, the mode selection engine 222 can indicate this to the mode selection engine 222 or bypass providing this indication to the mode selection engine 222.

When the mode selection engine 222 selects a location-based biasing mode according to the geographic criteria that has been satisfied, the mode selection engine 222 can indicate this selection to a location-based biasing engine 224. The location-based biasing engine 224 can use the selection of a particular location-based biasing mode in order to cause processing of certain inputs and/or outputs to be biased according to the particular location-based biasing mode that was selected. For example, when a first location-based biasing mode is selected, the location-based biasing engine 224 can cause the automated assistant 204 to process certain inputs that are related to a particular area to be modified to include certain prioritized data. For instance, the prioritized data can be a subset of data from one or more sources that are related to an input from the user, and/or output from the automated assistant, and provide details about certain features of a geographic area. Furthermore, when a second location-based biasing mode is selected, the location-based biasing engine 224 can cause the automated assistant 204 to process certain inputs that are related to a particular location of interest to be modified to include certain other prioritized data. For instance, the other prioritized data can be a separate subset of data from one or more other sources that are related to the input from the user, and/or output from the automated assistant, and provide details about certain features of the location of interest.

In accordance with some implementations, speech-to-text processing according to a first or second location-based biasing mode can result in a plurality of candidate textual transcriptions of a spoken utterance from a user and/or one or more candidate response transcriptions. Each of the candidate transcriptions can be associated with a corresponding score that indicates confidence the transcription is correct. Such a score can be based on, for example, a degree of matching between the phonemes and the candidate transcriptions. When the automated assistant is operating according to the first location-based biasing mode, a score for a transcription that includes one or more terms associated with an area that the user is located can be biased and/or prioritized over other scores for other transcriptions that do not include one or more terms associated with the area. When the automated assistant is operating according to the second location-based biasing mode, a score for a transcription that includes one or more terms associated with a location of interest in which the user is located can be biased and/or prioritized over other scores for other transcriptions that do not include the one or more terms associated with the location of interest.

As an example, when a user is at their home and provides a spoken utterance such as, "Assistant, where is the Louvre?" the automated assistant can generate multiple different candidate response transcriptions. When the user is located at their home, candidate transcriptions that include terms derived from sources associated with their home (e.g., a travel website provided by a company in the United States) can be scored similar to sources from other locations (e.g., France). However, when the user provides this spoken utterance when located in Paris, but not within a threshold distance from the Louvre, the automated assistant can operate according to a first location-based biasing mode. As a result, transcriptions that include terms derived from sources associated with France (e.g., French blogs about the Louvre, website for public transit in Paris) can be scored and/or prioritized over other transcriptions not including such terms. Alternatively, or additionally, when the user provides this spoken utterance when located within the threshold distance from the Louvre, the automated assistant can operate according to a second location-based biasing mode. As a result, the transcriptions that include terms derived from sources associated with the Louvre (e.g, a website owned by the Louvre museum) can be scored and/or prioritized over other transcriptions not including such terms.

Figure 3:
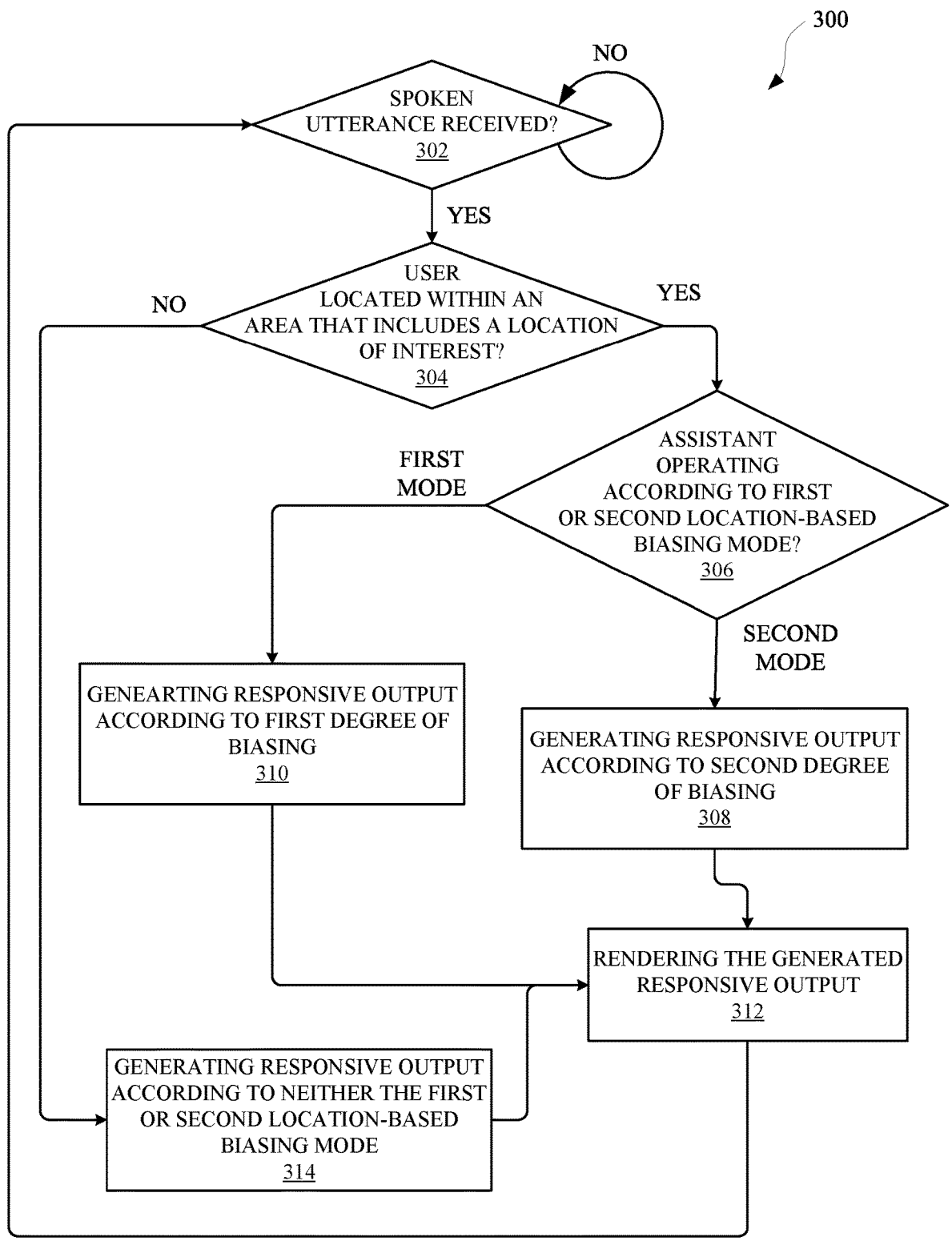
FIG. 3 illustrates a method for generating responsive content from an automated assistant that can operate according to a variety of different location-based biasing modes for rendering content useful for mitigating waste of computational resources.

FIG. 3 illustrates a method 300 for generating responsive content from an automated assistant that can operate according to a variety of different location-based biasing modes for allowing a user to provide concise spoken inputs when visiting various locations. The method 300 can be performed by one or more applications, computing devices, and/or any other apparatus or module capable of providing access to an automated assistant. The method 300 can include an operation 302 of determining whether a spoken utterance has been received by an automated assistant via one or more assistant interfaces of a portable computing device. When a spoken utterance has not been received at the portable computing device, the operation 302 can be repeated until one or more users provides the spoken utterance to the automated assistant. However, when a spoken utterance is received by the automated assistant, the method 300 can proceed from the operation 302 to the operation 304. It should be noted that the operations of the method 300 can be performed in an order that is different from the order of operations provided in FIG. 3.

The operation 304 can include determining whether the user is located within an area that includes a location of interest. An area can be, for example, a geographic area, and a location of interest can be a landmark that is characterized by any public data that is accessible to the portable computing device. For instance, the landmark can be a historical monument that is described by one or more public web pages and/or one or more applications that are accessible via the portable computing device. Therefore, the user may use a browser application in order to navigate to a particular web page that includes information about the landmark. When the user is determined to not be located within an area that includes a location of interest, the method 300 can proceed from the operation 304 to the operation 314. The operation 314 can include generating a responsive output according to neither a first location-based biasing mode nor a second location based biasing mode. For example, when the user is located within their home, which may not include a landmark that is described by any public data, the automated assistant can generate a responsive output according to a spoken utterance and/or any other data that is accessible to the automated assistant, without biasing to a degree that biasing would otherwise occur in the first or second location-based biasing mode. As one example, the spoken utterance can be, "Assistant, where can I go to learn more about Lincoln?", and a responsive output generated by the automated assistant according to the operation 304 can be, "You can see a movie about former US President Lincoln at the movie theater 1.2 miles away." In other words, the automated assistant can provide web results that have not been specifically biased according to any location-based biasing mode for biasing inputs to, and/or outputs from the automated assistant, according to implementations discussed herein.

When the user is determined, at the operation 304, to be located within an area that includes a location of interest, the method 300 can proceed from the operation 304 to the operation 306. The operation 306 can include determining whether the automated assistant is operating according to a first location-based biasing mode or a second location-based biasing mode. In some implementations, the operation 306 can be an operation of determining whether a context of the user satisfies particular criteria associated with the first location-based biasing mode or the second location-based biasing mode. For example, when the user is determined to be located within a threshold distance of particular area, the method 300 can proceed from the operation 306 to the operation 310. However, when the user is determined to be located within another threshold distance of a location of interest within the particular area, the method 300 can proceed from the operation 306 to the operation 308. Additionally, or alternatively, the automated assistant can operate according to the first location-based biasing mode or the second location-based biasing mode depending on how a user responded to a particular prompt that requested the user to select from one or more location-based biasing modes.

The operation 310 can include generating responsive output according to a first degree of biasing. The first degree at biasing can refer to a first extent to which processing of an input and/or an output is biased toward a particular subset of data of location characteristic data. For instance, and in accordance with the previous example, processing of the spoken utterance provided by the user can be performed according to a first extent of biasing toward location characteristic data associated with an area in which the user is located. For example, the user can be located in the District of Columbia when the user provided the spoken utterance, "Assistant, where can I go to learn more about Lincoln?" In accordance with the operation 310, natural language content of the spoken utterance can be modified in order to bias the spoken utterance to further identify features of the area that the user is located.

For instance, the request embodied by the spoken utterance can be modified to include an alias for the area that the user is located, such as the alias "DC." As a result, the request can be modified to be: "Where can I go to learn more about Lincoln [in DC]." In this way, processing the modified request can yield a responsive output from the automated assistant that is biased toward the area that the user is located. Furthermore, this can mitigate waste of computational resources that might otherwise be consumed when the user is required to specify the alias via spoken utterance, thereby causing additional audio data to be processed at the portable computing device and/or any other related device.

The operation 308 can include generating responsive output according to a second degree of biasing, which can refer to a second extent to which processing of an input and/or an output is biased toward a particular subset of location characteristic data. In some implementations, the second extent to which processing of an input and/or an output is biased can be greater than the first extent to which the input and/or the output is biased. For example, when the user is located within a threshold distance from the Lincoln Memorial in the District of Columbia, and/or a geographic characteristic of the user satisfies a geographic criteria associated with the Lincoln Memorial, the spoken utterance and/or the responsive output can be biased according to the second degree of biasing. For instance, in response to receiving the spoken utterance, "Assistant, where can I go to learn more about Lincoln," while the user is located at the Lincoln Memorial, processing of a subset of location characteristic data associated with the District of Columbia and the Lincoln Memorial can be biased such that the subset is prioritized over other subsets of location characteristic data associated with the District of Columbia.

In some implementations, correlations between certain subsets of data of the location characteristic data can be designated for particular locations of interest within the area by one or more entities, such as a third party entity that is different from an entity that provided the automated assistant. Therefore, in response to receiving the spoken utterance and based on either the location-based biasing mode and/or the user having a geographic characteristic that satisfies the geographic criteria associated with the Lincoln Memorial, a subset of data designated for the Lincoln Memorial can be identified by the automated assistant. This subset of data can be scored such that the score assigned to the subset of data can be prioritized over other subsets of data of the location characteristic data. In this way, when the automated assistant is generating responsive output in response to the spoken utterance, the subset of data designated for the Lincoln Memorial can be biased over other subsets of data. As a result, the automated assistant can generate a responsive output such as, "An entrance to a museum is located at the base of the Lincoln Memorial." In some implementations, the subset of data can be biased according to a trajectory of the user when the user provided they spoken utterance and/or thereafter. For example, when the geographic characteristic of the user satisfies the geographic criteria corresponding to the location of interest, the trajectory of the user can be used along with the geographic characteristic in order to bias processing of a particular subset of data of the location characteristic data. For instance, particular directions for reaching the museum that is located at the base of the Lincoln Memorial can be incorporated into the responsive output based on the trajectory of the user (e.g., "An entrance to a museum is located at the base of the Lincoln Memorial and to the left as you approach the Lincoln Memorial.").

The method 300 can further include an operation 312 of rendering the generated responsive output. Rendering the generated responsive output can include causing the automated assistant to provide the responsive output via one or more interfaces of the portable computing device and/or any other computing device that is in communication with the portable computing device. For example, rendering the generated responsive output can include providing an audio output that embodies natural language content that is based on the responsive output generated by the automated assistant. Alternatively, or additionally, rendering the generated responsive output can include providing graphical data that embodies the responsive output generated by the automated assistant. In this way, while the user is visiting away from their residence, access to useful information can be streamlined in order that certain computational resources can be preserved at the portable computing device and/or any other associated device.

For instance, the output provided according to the second degree of biasing can save the user from having to open a web browser in order to search for additional information about the location of interest, thereby saving power that might otherwise be consumed displaying graphical content at a display interface of the portable computing device. Furthermore, as many web browsers tend to consume processing bandwidth at computing devices, the user can benefit from bypassing using the web browser by invoking the automated assistant for information while visiting. In some implementations, location characteristic data can be preloaded in response to determining that the user is visiting away from their residence to a particular area that includes a particular location of interest. This preloaded location characteristic data can be stored at the portable computing device and would therefore be accessible without being connected to a local area network and/or a wide area network. Furthermore, the automated assistant can be operable exclusively at the portable computing device in some implementations, thereby further preserving network resources that might otherwise be consumed transmitting inputs and outputs between network servers. Biasing of the processing of subsets of the location characteristic data can be performed at the portable computing device and/or a separate server device. Such biasing can be performed in real time as a user maneuvers between locations of interest within an area, arrives to an area, departs from an area, and/or otherwise exhibits dynamic geographic characteristics.

Figure 4A:
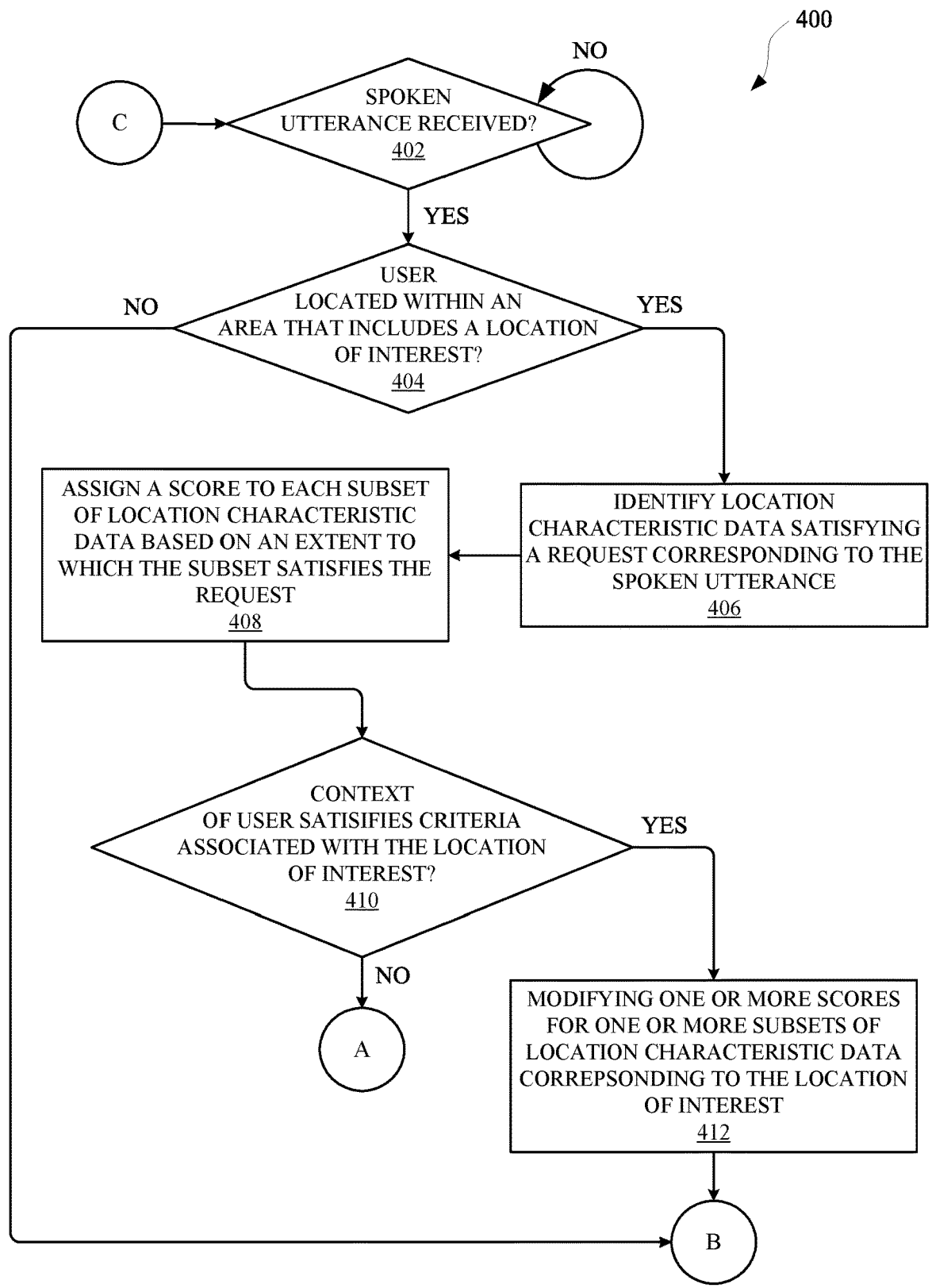
FIG. 4A and FIG. 4B illustrate method(s) for rendering responsive output according to one or more location-based biasing modes for an automated assistant.
Figure 4B:
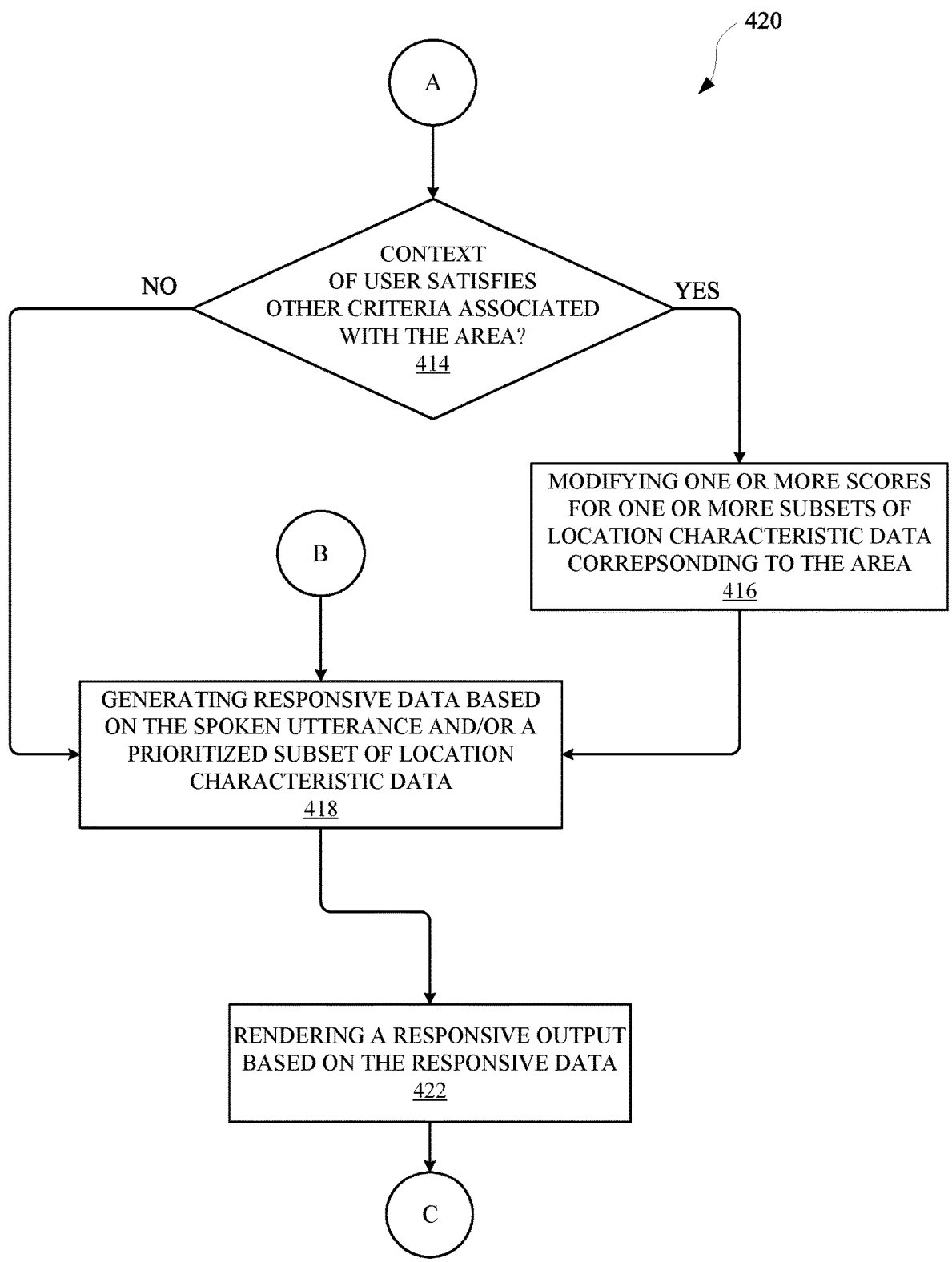

FIG. 4A and FIG. 4B illustrate a method 400 and a method 420 for rendering responsive output according to one or more location-based biasing modes for an automated assistant. The method 400 and the method 420 can be performed by one or more applications, computing devices, and/or any other apparatus or module capable of providing access to an automated assistant. The method 400 can include an operation 402 of determining whether a spoken utterance was received by a computing device that provides access to an automated assistant. The automated assistant can be operable according to one or more operating modes that include one or more location based biasing modes. Each location-based biasing mode allows the automated assistant to bias processing of inputs and/or outputs according to whether the user is visiting an area that includes a location of interest. When a spoken utterance is received at the computing device, the method 400 can proceed from the operation 402 to the operation 404. However, when a spoken utterance is not detected at the computing device, the computing device can continue to monitor for a spoken utterance that is directed to the automated assistant.

The operation 404 can include determining whether the user is located within an area that includes a location of interest. The area can be any geographic location and the location of interest can be any particular location that is characterized by data that is available from one or more sources that are accessible via the computing device. For example, the area can be a historical city located in a foreign country relative to a country that the user typically resides. Furthermore, the location of interest can be a historical landmark, famous restaurant, city center, metro station, and/or any other location within an area. When the user is determined to not be located within an area that includes a location of interest, the method 400 can proceed to an operation 416 via a continuation element "B." The continuation element "B" can indicate that the operation 404 of the method 400 continues to the operation 418 of the method 420 via the continuation element "B." The operation 418 can include generating responsive data based on the spoken utterance received at the computing device. However, when the user is determined to be located within the area that includes the location of interest, the method 400 can proceed from the operation 404 to the operation 406.

The operation 406 can include identifying location characteristic data satisfying a request corresponding to the spoken utterance. The location characteristic data can be a set of data provided by one or more sources of data that characterizes the area and/or the location of interest. For example, the location characteristic data can include data from one or more websites describing the area and/or the location of interest. The method 400 can proceed from the operation 406 to the operation 408, which can include assigning a score to each subset of the set of location characteristic data based on an extent or degree to which the subset satisfies the request. For example, when the spoken utterance includes natural language content such as, "Assistant, how tall is it?", a score for a particular website that details dimensions of certain features of the location of interest can be prioritized higher than another website that does not include details of dimensions of certain features of the location of interest—but otherwise provides information about the location of interest. In this way, data provided by the particular website can be considered a subset of the location characteristic data, and the other website can be considered another subset of the location characteristic data. The subset of location characteristic data would therefore, based on the assigned score, be prioritized over the other subset of location characteristic data.

The method 400 can proceed from the operation 408 to the operation 410, which can include determining whether a context of the user satisfies criteria associated with the location of interest. For example, the criteria can be a threshold distance from the location of interest within the area. Therefore, the context of the user can satisfy the criteria when the user is located at a distance that is at or within the threshold distance. Alternatively, or additionally, the criteria can be one or more features of a context of the user, such as: whether they are maneuvering toward or away from the location of interest, whether they are located above, below, or level with the location of interest, an arrival time that the user will be able to arrive at the location of interest from their current location, whether the user has ever visited the location of interest before, and/or any other property that can describe the context of the user relative to a location of interest. When the context of the user satisfies the criteria, the method 400 can proceed to an operation 412. However, when the context of the user does not satisfy the criteria, the method 400 can proceed from the operation 410, via a continuation element "A," to an operation 414 of the method 420.

The operation 412 can include modifying one or more scores for one or more subsets of location characteristic data corresponding to the location of interest. In other words, because the context of the user satisfies the criteria, one or more subsets of location characteristic data that correspond to the location of interest can be assigned a score, and/or can have their respective score modified, in order to prioritize the one or more subsets of location characteristic data. In this way, a subset of location characteristic data that is prioritized over all other subsets of location characteristic data can be used as a basis for providing a responsive output to the user in response to the spoken utterance. The method 400 can proceed from the operation 412, via continuation element "B," to the operation 418, discussed herein. However, as previously discussed, when the context of the user does not satisfy the criteria associated with the location of interest, the method 400 can proceed from the operation 410 to the operation 414.

The operation 414 can include determining whether the context of the user satisfies other criteria associated with the area. For example, the other criteria can be another threshold distance from the area, and therefore the context of the user can satisfy the geographic criteria when the user is located at a distance that is at, or within, the other threshold distance. Alternatively, or additionally, the other criteria can be one or more features of a context of the user, such as whether they are maneuvering toward or away from the area, located above, below, or level with the area, an arrival time that the user will be able to arrive at the area from their current location, whether the user has ever visited the area in the past, and/or any other property that can describe the context of the user relative to the area.

When the context of the user fails to satisfy the other criteria associated with the area, the method 420 can proceed from the operation 414 to the operation 418. However, when the context of the user satisfies the other criteria associated with the area, the method 420 can proceed from the operation 414 to an operation 416. The operation 416 can include modifying one or more scores for one or more subsets of location characteristic data corresponding to the area. In other words, because the context of the user satisfies the other criteria, one or more subsets of location characteristic data that correspond to the area can be assigned a score, and/or can have their respective score modified, in order to prioritize the one or more subsets of location characteristic data over other data associated with the spoken utterance. The method 420 can proceed from the operation 416 to the operation 418, which can include generating responsive data based on the spoken utterance and/or a subset of location characteristic data that is prioritized over any other subsets of location characteristic data.

The method 420 can proceed from the operation 418 to an operation 422, which can include rendering a responsive output based on the responsive data. The responsive output can be rendered by the computing device and/or the automated assistant, to which the spoken utterance was directed. For example, when the context of the user satisfies the criteria corresponding to the location of interest, the responsive output rendered in response to a spoken utterance such as, "Assistant, how tall is it?", can be based on a subset of location characteristic data characterizing a particular landmark corresponding to the location of interest. For example, the automated assistant can provide a responsive output such as, "The Great Bhudda statue is 92 meters tall," when the user is located within a threshold distance (e.g., 10 meters, 30 meters, and/or any other distance) of the Great Bhudda statue in Thailand.

However, when the context of the user satisfies the other criteria corresponding to the area, but not the criteria corresponding to the location of interest, the responsive output rendered in response to the spoken utterance can be based on another subset of location characteristic data. The other subset of location characteristic data can characterize a highest point in elevation within the area and/or dimensions of one or more structures within the area. For example, the automated assistant can provide a different responses output such as, "The tallest point in Thailand is Doi Inthanon, which is 2,565 meters tall," when the user is within the area, Thailand, but not located within a threshold distance of a location of interest. Alternatively, when the user is viewing content on their computing device at home, the responsive output can be more biased toward the content being viewed, rather than the area or location of interest that might be near the user.

For example, when the user is viewing a television program about the great Buddha statue, and provides the spoken utterance (e.g., "How tall is it?), the responsive output can be biased toward the content of the television program (e.g., "The Great Bhudda statue is 92 meters tall.") rather than location characteristic data corresponding to a current location of the user. In this way, the user can provide condensed requests based on the automated assistant being able to bias processing of inputs and/or outputs according to the location of the user and/or other data that may be relevant to the request from the user. In particular, when a user is visiting a foreign area or foreign location of interest, the user would be able to preserve the computational resources at the computing device by reducing an average length of spoken utterances provided to their respective automated assistant.

Figure 5:
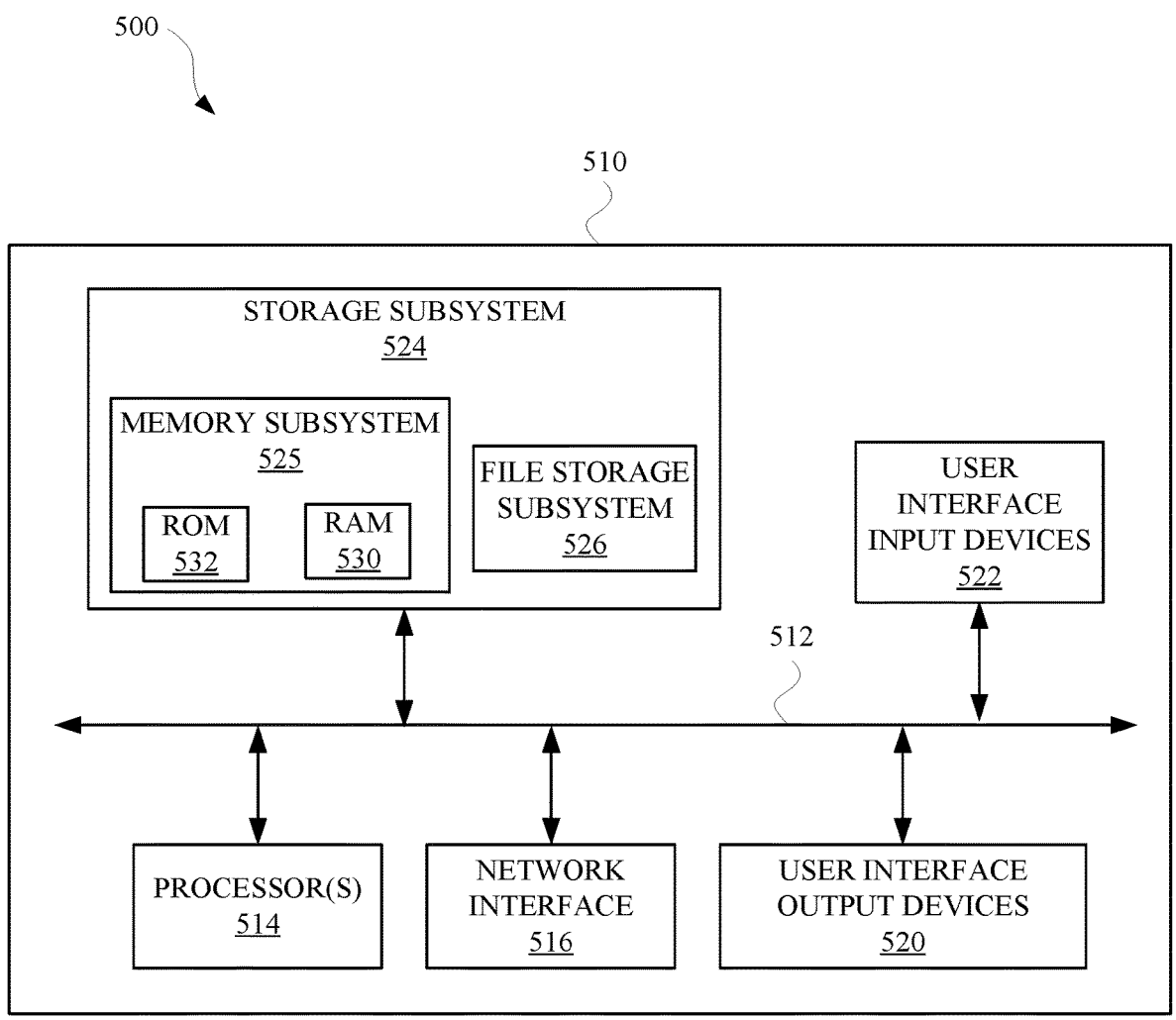
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and method 420, and/or to implement one or more of system 200, computing device 104, computing device 140, computing device 202, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, based on data accessible via a portable computing device, that a user is within an area that includes a location of interest, wherein the location of interest is associated with location characteristic data that is accessible via one or more applications of the portable computing device, and wherein the portable computing device is operable in a first location-based biasing mode and a second location-based biasing mode. The method can further include an operation of receiving, via an automated assistant of the portable computing device, a spoken utterance from the user, wherein the spoken utterance includes natural language content corresponding to a request for the automated assistant to provide information about the location of interest. The method can, when the portable computing device is operating in the first location-based biasing mode: generating, in response to receiving the spoken utterance from the user, responsive data by biasing, according to a first degree of biasing, a data selection from the location characteristic data, and rendering, via the automated assistant of the portable computing device, a responsive output that is based on the responsive data. The method can further include an operation of, when the portable computing device is operating in the second location-based biasing mode: generating, in response to receiving the spoken utterance from the user, other responsive data by biasing, according to a second degree of biasing that corresponds to a greater degree of biasing than the first degree of biasing, another data selection from the location characteristic data, and rendering, via the automated assistant of the portable computing device, another responsive output that is based on the other responsive data.

In some implementations, biasing the other data selection from the location characteristic data according to the second degree of biasing includes modifying the request by replacing a pronoun of the request with an alias having a defined relationship to the location of interest. In some implementations, biasing the data selection from the location characteristic data according to the first degree of biasing includes modifying the request by replacing the pronoun of the request with an alias having a defined relationship to the area. In some implementations, the location characteristic data includes particular content characterizing features of the area and the location of interest. In some implementations, biasing the other data selection from the location characteristic data according to the second degree of biasing includes restricting the data selection to a particular subset of the location characteristic data. In some implementations, biasing the data selection from the location characteristic data according to the first degree of biasing includes promoting a score assigned to the particular content, from the location characteristic data, that satisfies the request, and wherein generating the other responsive data is based on the scoring.

In some implementations, biasing the data selection from the location characteristic data according to the first degree of biasing includes promoting scores, to a first extent, for any of the particular content that satisfies the request. In some implementations, biasing the other data selection from the location characteristic data according to the second degree of biasing includes promoting scores, to a second extent that is of greater magnitude than the first extent, for any of the particular content that matches the request. In some implementations, the method can further include an operation of, responsive to determining that the user is within the area that includes the location of interest: causing the portable computing device to render a prompt that solicits whether the user desires the automated assistant to enter second location-based biasing mode; and causing the computing device to operate according to the second location-based biasing mode responsive to receiving an affirmative user input responsive to the prompt. In some implementations, determining, based on data that is specific to the user and mapped to the location of interest, that the location of interest is relevant to the user being within the area, wherein causing the portable computing device to render the prompt is further responsive to determining that the location of interest is relevant to the user being within the area.

In some implementations, the method can further include an operation of determining, based on data that is specific to the user and mapped to the location of interest, that the location of interest is relevant to the user being within the area; and responsive to determining that the user is within the area that includes the location of interest, and determining that the location of interest is relevant to the user being within the area: automatically causing the computing device to operate according to the second location-based biasing mode. In some implementations, wherein biasing the data selection from the location characteristic data according to the first degree of biasing includes refraining from modifying the request, and wherein biasing the other data selection from the location characteristic data according to the second degree of biasing includes modifying the request by adding an alias having a defined relationship to the area.

In some implementations, wherein biasing the data selection from the location characteristic data according to the first degree of biasing includes biasing speech to text processing toward a first set of terms that are related to the location of interest without biasing toward a second set of terms that are also related to the location of interest, and wherein biasing the other data selection from the location characteristic data according to the second degree of biasing includes biasing speech to text processing toward the first set of terms and toward the second set of terms. In some implementations, the method can further include an operation of selecting the first set of terms based on the first set of terms being most frequently occurring in one or more corpora associated with the location of interest.

In some implementations, the method can further include an operation of determining, based on determining that the user is within the area that includes the location of interest, whether the area or the location of interest was identified in assistant data that was generated during an interaction between the automated assistant and the user prior to the user being located within the area that includes the location of interest, wherein the computing device operates in the first location-based biasing mode when the area is identified in the assistant data, and the computing device operates in the second location-based biasing mode when the location of interest is identified in the assistant data.

In other implementations, a method implemented by one or more processors is set forth as including operations such as determining, based on data accessible via a portable computing device, that a user is geographically located within an area that includes a location of interest, wherein the location of interest is characterized by location characteristic data that is accessible via one or more applications of the portable computing device. The method can further include an operation of receiving, via an automated assistant of the portable computing device, a spoken utterance from the user, wherein the spoken utterance includes natural language content corresponding to a request for the automated assistant to provide information about the location of interest. The method can further include an operation of assigning a score for each subset of location characteristic data, of subsets of location characteristic data, according to an extent to which each subset of location characteristic data satisfies a request characterized by the spoken utterance, and when a geographic location of the user satisfies a geographic criteria associated with the location of interest: identifying a particular score assigned to a subset of the location characteristic data that characterizes the location of interest, and causing the particular score assigned to the subset of the location characteristic data to be modified, at least based on the subset of location characteristic data characterizing the location of interest. The method can further include an operation of, when the geographic location of the user does not satisfy the geographic criteria associated with the location of interest: identifying another particular score assigned to another subset of the location characteristic data that characterizes the area, and causing the other particular score assigned to the other subset of the location characteristic data to be modified, at least based on the other subset of location characteristic data characterizing the area. The method can further include an operation of causing, in response to receiving the spoken utterance from the user, the automated assistant to render a responsive output via the portable computing device and based on a particular subset of the location characteristic data having an assigned score that is prioritized over other available subsets of the location characteristic data.

In some implementations, the method can further include an operation of modifying the request to include particular content that is based on the particular subset of the location characteristic data, wherein the responsive output is based on the modified request. In some implementations, the method can further include an operation of, when the geographic location of the user satisfies a geographic criteria associated with the location of interest: modifying the request to replace a pronoun of the request with an alias having a defined relationship to the location of interest, wherein assigning the score for each subset of location characteristic data, of subsets of location characteristic data, is performed according to the extent to which each subset of location characteristic data satisfies the modified request.

In some implementations, the method can further include an operation of, when the geographic location of the user does not satisfy the geographic criteria associated with the location of interest: modifying the request to replace the pronoun of the request with another alias having another defined relationship to the area, wherein assigning the score for each subset of location characteristic data, of subsets of location characteristic data, is performed according to the extent to which each subset of location characteristic data satisfies the modified request. In some implementations, the method can further include an operation of, when a geographic location of the user satisfies a geographic criteria associated with the location of interest: causing the portable computing device to render a prompt that solicits the user to select whether to operate the automated assistant according to a location-based biasing mode. In some implementations, the method can further include an operation of receiving an affirmative user input in furtherance causing the automated assistant to operate according to the location-based biasing mode.

In yet other implementations, a method implemented by one or more processors is set forth as including operations such as receiving, from a user that is located within a geographic area, a spoken utterance corresponding to a request for the automated assistant to provide a response, wherein the automated assistant is operating at a computing device according to a first location-based biasing mode when the spoken utterance is received at the computing device. The method can further include an operation of providing, in response to receiving the spoken utterance, a responsive output according to the first location-based biasing mode, wherein the first location-based biasing mode causes the automated assistant to prioritize one or more subsets of location characteristic data when generating the responsive output, and wherein the responsive output identifies a location of interest within the area and is based on a most prioritized subset of the location characteristic data. The method can further include an operation of determining, subsequent to the automated assistant providing the responsive output, that the user has relocated to the location of interest that is located within the area. The method can further include an operation of causing, based at least on the user relocating to the location of interest, the automated assistant to operate according to a second location-based biasing mode that is different from the first location-based biasing mode, wherein the second location-based biasing mode causes the automated assistant to prioritize one or more other subsets of the location characteristic data when generating another responsive output, and wherein the one or more other subsets of location characteristic data are prioritized based on a degree of correspondence between the one or more other subsets of the location characteristic data and the location of interest. The method can further include an operation of receiving, while the automated assistant is operating according to the second location-based biasing mode, another spoken utterance corresponding to a separate request for the automated assistant to provide information associated with the location of interest. The method can further include an operation of providing, in response to receiving the other spoken utterance, the other responsive output according to the second location-based biasing mode, wherein the other responsive output is based on a most prioritized other subset of the location characteristic data.

In some implementations, the one or more other subsets of the location characteristic data are included in the one or more subsets of the location characteristic data. In some implementations, the method can further include an operation of causing, based at least on the user relocating to the location of interest, the computing device to render a prompt that solicits the user to select whether to transition the automated assistant into the second location-based biasing mode from the first location-based biasing mode, wherein causing the automated assistant to operate according to the second location-based biasing mode is based on the user providing an affirmative selection of the second location-based biasing mode in response to the prompt. In some implementations, providing the responsive output according to the first location-based biasing mode includes generating a query that includes natural language content of the spoken utterance and an alias for one or more words in the natural language content, wherein the alias is selected based on the prioritized one or more subsets of location characteristic data.

In some implementations, providing the other responsive output according to the second location-based biasing mode includes generating another query that includes other natural language content of the other spoken utterance and another alias for one or more other words in the other natural language content, and wherein the other alias is selected based on the one or more other subsets of location characteristic data. In some implementations, processing the input includes: determining, for each subset of the one or more subsets of location characteristic data, an embedding distance between an input embedding corresponding to the spoken utterance and each embedding corresponding to a particular subset of the one or more subsets of location characteristic data, wherein the most prioritized subset of location characteristic data corresponds to a shortest embedding distance relative to other determined embedding distances. In some implementations, providing another responsive output according to the second location-based biasing mode includes: assigning one or more scores to one or more other subsets of the location characteristic data based on a degree of correspondence between the one or more other subsets of location characteristic data and the other spoken utterance, and based on another degree of correspondence between the one or more other subsets of location characteristic data and the location of interest. In some implementations, the method can further include an operation of providing, supplemental responsive output according to the second location-based biasing mode, wherein the supplemental responsive output is rendered proactively by the automated assistant in response to the user relocating to the location of interest that is located within the area, and wherein the supplemental responsive output is different from the responsive output and the other responsive output.

What is claimed is:

1. A method implemented by one or more processors, the method comprising:
   determining, based on data accessible via a portable computing device, that a user is within an area that includes a location of interest,
      wherein the location of interest is associated with location characteristic data that is accessible via one or more applications of the portable computing device,
      wherein the location characteristic data includes particular content characterizing features of the area and the location of interest, and
      wherein the portable computing device is operable in a first location-based biasing mode and a second location-based biasing mode;
   receiving, via an automated assistant of the portable computing device, a spoken utterance from the user,
      wherein the spoken utterance includes natural language content corresponding to a request for the automated assistant to provide information about the location of interest;
   when the portable computing device is operating in the first location-based biasing mode:
      generating, in response to receiving the spoken utterance from the user, responsive data by biasing, according to a first degree of biasing, a data selection from the location characteristic data, wherein biasing according to the first degree of biasing includes refraining from modifying the request, and rendering, via the automated assistant of the portable computing device, a responsive output that is based on the responsive data; and when the portable computing device is operating in the second location-based biasing mode:

generating, in response to receiving the spoken utterance from the user, other responsive data by biasing, according to a second degree of biasing that corresponds to a greater degree of biasing than the first degree of biasing, another data selection from the location characteristic data, wherein biasing according to the second degree of biasing includes modifying the request by adding an alias having a defined relationship to the area, and rendering, via the automated assistant of the portable computing device, another responsive output that is based on the other responsive data.

2. The method of claim 1, wherein biasing the other data selection from the location characteristic data according to the second degree of biasing includes modifying the request by replacing a pronoun of the request with an alias having a defined relationship to the location of interest.

3. The method of claim 1, wherein biasing the other data selection from the location characteristic data according to the second degree of biasing includes restricting the data selection to a particular subset of the location characteristic data.

4. The method of claim 3, wherein biasing the data selection from the location characteristic data according to the first degree of biasing includes promoting a score assigned to the particular content, from the location characteristic data, that satisfies the request, and wherein generating the other responsive data is based on the scoring.

5. The method of claim 1, wherein biasing the data selection from the location characteristic data according to the first degree of biasing includes promoting scores, to a first extent, for any of the particular content that satisfies the request.

6. The method of claim 5, wherein biasing the other data selection from the location characteristic data according to the second degree of biasing includes promoting scores, to a second extent that is of greater magnitude than the first extent, for any of the particular content that matches the request.

7. The method of claim 1, further comprising:
responsive to determining that the user is within the area that includes the location of interest:
causing the portable computing device to render a prompt that solicits whether the user desires the automated assistant to enter second location-based biasing mode; and
causing the computing device to operate according to the second location-based biasing mode responsive to receiving an affirmative user input responsive to the prompt.

8. The method of claim 1,
wherein biasing the data selection from the location characteristic data according to the first degree of biasing includes biasing speech to text processing toward a first set of terms that are related to the location of interest without biasing toward a second set of terms that are also related to the location of interest, and
wherein biasing the other data selection from the location characteristic data according to the second degree of biasing includes biasing speech to text processing toward the first set of terms and toward the second set of terms.

9. The method of claim 1, further comprising:
determining, based on determining that the user is within the area that includes the location of interest, whether the area or the location of interest was identified in assistant data that was generated during an interaction between the automated assistant and the user prior to the user being located within the area that includes the location of interest,
wherein the computing device operates in the first location-based biasing mode when the area is identified in the assistant data, and the computing device operates in the second location-based biasing mode when the location of interest is identified in the assistant data.

10. A method implemented by one or more processors, the method comprising:
determining, based on data accessible via a portable computing device, that a user is geographically located within an area that includes a location of interest,
wherein the location of interest is characterized by location characteristic data that is accessible via one or more applications of the portable computing device;
receiving, via an automated assistant of the portable computing device, a spoken utterance from the user,
wherein the spoken utterance includes natural language content corresponding to a request for the automated assistant to provide information about the location of interest;
assigning a score for each subset of location characteristic data, of subsets of location characteristic data, according to an extent to which each subset of location characteristic data satisfies a request characterized by the spoken utterance, and
when a geographic location of the user satisfies a geographic criteria associated with the location of interest:
identifying a particular score assigned to a subset of the location characteristic data that characterizes the location of interest, and
causing the particular score assigned to the subset of the location characteristic data to be modified, at least based on the subset of location characteristic data characterizing the location of interest;
when the geographic location of the user does not satisfy the geographic criteria associated with the location of interest:
identifying another particular score assigned to another subset of the location characteristic data that characterizes the area, and
causing the other particular score assigned to the other subset of the location characteristic data to be modified, at least based on the other subset of location characteristic data characterizing the area; and
causing, in response to receiving the spoken utterance from the user, the automated assistant to render a responsive output via the portable computing device and based on a particular subset of the location characteristic data having an assigned score that is prioritized over other available subsets of the location characteristic data.

11. The method of claim 10, further comprising:
when the geographic location of the user satisfies a geographic criteria associated with the location of interest:
modifying the request to replace a pronoun of the request with an alias having a defined relationship to the location of interest, wherein assigning the score for each subset of location characteristic data, of subsets of location characteristic data, is performed according to the extent to which each subset of location characteristic data satisfies the modified request.

12. The method of claim 10, further comprising:
when the geographic location of the user does not satisfy the geographic criteria associated with the location of interest:
modifying the request to replace a pronoun of the request with another alias having another defined relationship to the area,
wherein assigning the score for each subset of location characteristic data, of subsets of location characteristic data, is performed according to the extent to which each subset of location characteristic data satisfies the modified request.

13. The method of claim 10, further comprising:
when a geographic location of the user satisfies a geographic criteria associated with the location of interest:
causing the portable computing device to render a prompt that solicits the user to select whether to operate the automated assistant according to a location-based biasing mode; and
receiving an affirmative user input in furtherance causing the automated assistant to operate according to the location-based biasing mode.

14. A method implemented by one or more processors, the method comprising:
receiving, from a user that is located within a geographic area, a spoken utterance corresponding to a request for the automated assistant to provide a response,
wherein the automated assistant is operating at a computing device according to a first location-based biasing mode when the spoken utterance is received at the computing device;
providing, in response to receiving the spoken utterance, a responsive output according to the first location-based biasing mode,
wherein the first location-based biasing mode causes the automated assistant to prioritize one or more subsets of location characteristic data when generating the responsive output, and
wherein the responsive output identifies a location of interest within the area and is based on a most prioritized subset of the location characteristic data;
determining, subsequent to the automated assistant providing the responsive output, that the user has relocated to the location of interest that is located within the area;
causing, based at least on the user relocating to the location of interest, the automated assistant to operate according to a second location-based biasing mode that is different from the first location-based biasing mode,
wherein the second location-based biasing mode causes the automated assistant to prioritize one or more other subsets of the location characteristic data when generating another responsive output, and
wherein the one or more other subsets of location characteristic data are prioritized based on a degree of correspondence between the one or more other subsets of the location characteristic data and the location of interest;
receiving, while the automated assistant is operating according to the second location-based biasing mode, another spoken utterance corresponding to a separate request for the automated assistant to provide information associated with the location of interest; and
providing, in response to receiving the other spoken utterance, the other responsive output according to the second location-based biasing mode,
wherein the other responsive output is based on a most prioritized other subset of the location characteristic data.

15. The method of claim 14, further comprising:
causing, based at least on the user relocating to the location of interest, the computing device to render a prompt that solicits the user to select whether to transition the automated assistant into the second location-based biasing mode from the first location-based biasing mode,
wherein causing the automated assistant to operate according to the second location-based biasing mode is based on the user providing an affirmative selection of the second location-based biasing mode in response to the prompt.

16. The method of claim 14,
wherein providing the responsive output according to the first location-based biasing mode includes generating a query that includes natural language content of the spoken utterance and an alias for one or more words in the natural language content, and
wherein the alias is selected based on the prioritized one or more subsets of location characteristic data.

17. The method of claim 14, wherein prioritizing the one or more subsets of location characteristic data includes:
determining, for each subset of the one or more subsets of location characteristic data, an embedding distance between an input embedding corresponding to the spoken utterance and each embedding corresponding to a particular subset of the one or more subsets of location characteristic data,
wherein the most prioritized subset of location characteristic data corresponds to a shortest embedding distance relative to other determined embedding distances.

18. The method of claim 14, further comprising:
providing, supplemental responsive output according to the second location-based biasing mode,
wherein the supplemental responsive output is rendered proactively by the automated assistant in response to the user relocating to the location of interest that is located within the area, and wherein the supplemental responsive output is different from the responsive output and the other responsive output.

* * * * *